US012770994B2

(12) United States Patent
Wu et al.

(10) Patent No.: US 12,770,994 B2
(45) Date of Patent: Oct. 20, 2026

(54) BATTERY CELL COMPRISING LIQUID INJECTION HOLE, BATTERY, AND ELECTRIC DEVICE

(71) Applicant: CONTEMPORARY AMPEREX TECHNOLOGY CO., LIMITED, Ningde (CN)

(72) Inventors: Kai Wu, Ningde (CN); Weijie Luo, Ningde (CN); Huaen Luo, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/330,871

(22) Filed: Sep. 17, 2025

(65) Prior Publication Data

US 2026/0018757 A1 Jan. 15, 2026

Related U.S. Application Data

(63) Continuation of application No. PCT/CN2023/124232, filed on Oct. 12, 2023.

(30) Foreign Application Priority Data

Aug. 23, 2023 (CN) ......................... 202311070180.6

(51) Int. Cl.
*H01M 50/557* (2021.01)
*H01M 50/103* (2021.01)
(Continued)

(52) U.S. Cl.
CPC ....... *H01M 50/557* (2021.01); *H01M 50/103* (2021.01); *H01M 50/15* (2021.01);
(Continued)

(58) Field of Classification Search
CPC ............. H01M 50/609; H01M 50/627; H01M 50/636; H01M 50/645
See application file for complete search history.

(56) References Cited

U.S. PATENT DOCUMENTS

2023/0198112 A1* 6/2023 Oshima ............... H01M 50/609 429/74

FOREIGN PATENT DOCUMENTS

CN 113708017 A * 11/2021 .......... H01M 50/109
CN 114628794 A 6/2022
(Continued)

OTHER PUBLICATIONS

International Search Report in the international application No. PCT/CN2023/124232, mailed on Dec. 14, 2023, 7 pages with English translation.

(Continued)

*Primary Examiner* — Barbara L Gilliam
*Assistant Examiner* — Jordan E Berresford
(74) *Attorney, Agent, or Firm* — K&L Gates LLP

(57) ABSTRACT

A battery cell, a battery and an electric device, relating to the technical field of batteries. The battery cell comprises: a housing, an electrode column body and an electrode column cover plate, wherein the housing defines an accommodating cavity; the electrode column body is arranged on the housing; a communication channel in communication with the accommodating cavity is formed on the electrode column body; the electrode column cover plate is arranged on the electrode column body; and a liquid injection hole in communication with the communication channel is formed in the electrode column cover plate.

20 Claims, 8 Drawing Sheets

(51) Int. Cl.

| | |
|---|---|
| ***H01M 50/15*** | (2021.01) |
| ***H01M 50/209*** | (2021.01) |
| ***H01M 50/507*** | (2021.01) |
| ***H01M 50/645*** | (2021.01) |
| *B60L 50/64* | (2019.01) |

(52) U.S. Cl.

CPC ....... *H01M 50/209* (2021.01); *H01M 50/507* (2021.01); *H01M 50/645* (2021.01); *B60L 50/64* (2019.02); *H01M 2220/20* (2013.01)

(56) References Cited

FOREIGN PATENT DOCUMENTS

| | | | | |
|---|---|---|---|---|
| CN | 218731341 | U | | 3/2023 |
| CN | 218769993 | U | * | 3/2023 |
| CN | 219017872 | U | | 5/2023 |
| CN | 219144442 | U | | 6/2023 |
| CN | 116435725 | A | | 7/2023 |
| CN | 219419254 | U | | 7/2023 |
| CN | 219436096 | U | | 7/2023 |
| JP | 2012018861 | A | | 1/2012 |
| JP | 2012124009 | A | | 6/2012 |
| JP | 2022550613 | A | | 12/2022 |
| JP | 2023092256 | A | | 7/2023 |
| KR | 20060037849 | A | | 5/2006 |
| KR | 20070063066 | A | | 6/2007 |
| KR | 20230095006 | A | | 6/2023 |
| WO | 2007019754 | A1 | | 2/2007 |
| WO | 2022077912 | A1 | | 4/2022 |
| WO | 2022104958 | A1 | | 5/2022 |
| WO | 2022193857 | A1 | | 9/2022 |

OTHER PUBLICATIONS

ISA Written Opinion in the international application No. PCT/CN2023/124232, mailed on Dec. 14, 2023, 10 pages with English translation.

Office Action (with English Machine Translation), mailed Jun. 24, 2026, for corresponding Japanese Patent Application Serial No. 2025-550586.

Office Action (with English Translation), mailed Sep. 4, 2026, for corresponding Korean Patent Application Serial No. 10-2025-7027400.

* cited by examiner

BATTERY CELL COMPRISING LIQUID INJECTION HOLE, BATTERY, AND ELECTRIC DEVICE

CROSS-REFERENCE TO RELATED APPLICATION

The present application is a continuation of International Application No. PCT/CN2023/124232, filed Oct. 12, 2023, which is presented based on Chinese Patent Application No. 202311070180.6 filed on Aug. 23, 2023, and claims the priority to the Chinese Patent Application described above, the content of which is incorporated herein by reference in its entirety.

TECHNICAL FIELD

The present application relates to the technical field of batteries, and in particular, to a battery cell, a battery, and an electric device.

BACKGROUND

In recent years, new energy vehicles have developed by leaps and bounds. In the field of electric vehicles, power batteries, as the power source of electric vehicles, play an irreplaceable and important role. The power battery includes several battery cells; however, the battery cells require improvements in both use performance and manufacturability.

SUMMARY

Embodiments of the present application provide a battery cell, a battery, and an electric device, which can improve the use performance and the manufacturability of the battery cell.

In a first aspect, the embodiments of the present application provide a battery cell. The battery cell includes: a housing, post terminal bodies, and post terminal cover plates, where the housing defines an accommodating cavity; the post terminal bodies are disposed on the housing, and the post terminal body is provided with a communication channel in communication with the accommodating cavity; the post terminal body is lidded with the post terminal cover plate, and the post terminal cover plate is provided with a liquid injection hole in communication with the communication channel.

In the above technical solutions, the liquid injection hole is formed on the post terminal cover plate, and the post terminal body provided with the communication channel is provided, such that an electrolytic solution is injected at a post terminal composed of the post terminal body and the post terminal cover plate, and there is no need to separately dispose the liquid injection hole on the housing of the battery cell. Therefore, the liquid injection hole does not separately occupy the space of the housing, and the post terminal does not need to be made small to avoid the liquid injection hole, so that the area and the liquid passage area of the post terminal can be increased without increasing the dimension of the housing, which is beneficial to reducing the flow resistance and increasing the current passage efficiency of the battery cell. Moreover, the area of the post terminal is increased, which is also beneficial to the assembly and connection of the post terminal and the housing. In addition, since it is not necessary to increase the dimension of the housing in order to increase the area of the post terminal, it is advantageous for achieving miniaturization and light-weight design of the housing. In addition, there is no need to specially machine the housing in order to separately dispose the liquid injection hole on the housing. This helps to reduce the structural complexity and the machining difficulty of the housing. Moreover, there is no need to partially thicken the housing for welding a sealing pin to the housing, and thus the structure and machining of the housing can be further simplified, and there is also no need to thicken the housing as a whole for welding the sealing pin to the housing. Therefore, it is beneficial to meeting the requirements for lightness and thinness of the housing, increasing the energy density of the battery cell, and reducing the weight and material costs of the housing. Moreover, the liquid injection hole is formed on the post terminal cover plate, such that the manufacturing and machining of the liquid injection hole can be facilitated, and the dimension, shape, and the like of the liquid injection hole can easily meet the design requirements and application demands, which is beneficial to reducing the machining difficulty of the liquid injection hole and reducing the machining cost of the liquid injection hole. In addition, the liquid injection hole is formed on the post terminal cover plate, and the communication channel is disposed on the post terminal body at the same time, such that the liquid injection path can be extended to a certain extent, and the function of liquid injection buffer can be achieved to a certain extent, which is beneficial to reducing the possibility of splashing and overflow of the electrolytic solution during liquid injection or operation of the battery cell.

In some embodiments, the communication channel includes a first accommodating groove and a liquid transfer hole, the first accommodating groove opening toward a direction of the post terminal cover plate to be in communication with the liquid injection hole, and the liquid transfer hole penetrating through a groove wall of the first accommodating groove and communicating the first accommodating groove with the accommodating cavity.

In the above technical solutions, since the communication channel includes the first accommodating groove formed on the post terminal body, the first accommodating groove can act to buffer the electrolytic solution, and during the liquid injection or operation of the battery cell, the problems of splashing, overflow, etc. of the electrolytic solution can be mitigated. In addition, when the electrolytic solution is injected, because the first accommodating groove can buffer the electrolytic solution, the electrolytic solution injection efficiency is increased, and the groove side wall of the first accommodating groove can prevent the electrolytic solution from splashing out to some extent, thereby reducing external contamination caused by the electrolytic solution.

In some embodiments, the battery cell includes a battery cell assembly, the battery cell assembly including an active substance-coated part received in the accommodating cavity and a conductive part connected to the active substance-coated part; the post terminal bodies are provided with communication holes communicating the first accommodating groove with the accommodating cavity, one or a plurality of the communication holes are provided and at least one of the communication holes serves as the liquid transfer hole, and the conductive part is disposed on at least one of the communication holes in a penetrating manner to be at least partially received in the first accommodating groove.

In the above technical solutions, the conductive part is at least partially received in the first accommodating groove, such that the conductive part at least partially occupies the space in the first accommodating groove, thereby reducing the space in the accommodating cavity occupied by the conductive part, and saving the space in the accommodating cavity to accommodate a larger volume of the active substance-coated part, which is beneficial to increasing the energy density of the battery cell, or is beneficial to reducing the dimension of the battery cell when the energy density of the battery cell remains unchanged.

In some embodiments, the communication hole on which the conductive part is disposed in a penetrating manner is a first communication hole, and at least the first communication hole serves as the liquid transfer hole.

In the above technical solutions, when at least the first communication hole serves as the liquid transfer hole, the first communication hole has a liquid passage function, that is, the first communication hole provided with the conductive part in a penetrating manner can be configured to allow the electrolytic solution to pass through. In this case, at least the first communication hole can be configured to allow the electrolytic solution to pass through. Therefore, whether to provide a communication hole on which no conductive part is disposed in a penetrating manner can be selected as required, thereby facilitating the reduction of the total number of communication holes disposed, simplifying the structure and machining of the post terminal body, and improving the structural strength of the post terminal body.

In some embodiments, the communication holes on which the conductive parts are disposed in a penetrating manner are first communication holes, a plurality of the communication holes are provided and further include at least one second communication hole on which no conductive part is disposed in a penetrating manner, and at least the second communication hole serves as the liquid transfer hole.

In the above technical solutions, when at least the second communication hole serves as the liquid transfer hole, at least the second communication hole can be configured for allowing the electrolytic solution to pass through. In this case, there is no need to set the hole diameter or number of the first communication holes to be large in order to allow the electrolytic solution to pass through the first communication hole, and there is also no need to set the dimension of the conductive part to be small in order to allow the electrolytic solution to pass through the first communication hole, and it is only necessary to design the dimension of the first communication hole to be slightly larger than the dimension of the conductive part, such that the conductive part can pass through, thereby mitigating the problem that impurities or the like fall into the accommodating cavity from the gap between the conductive part and the first communication hole, and also mitigating the problem that the local strength of the post terminal body is weak due to the oversized first communication hole, and also making the dimension of the conductive part relatively large, which is beneficial to increasing the current passage efficiency. In addition, when the electrolytic solution passes through the second communication hole, the electrolytic solution is not affected by the conductive part, so that the liquid injection efficiency can be increased. In addition, the electrolytic solution is not prone to causing problems such as contamination and corrosion to the conductive part.

In some embodiments, an opening of the first accommodating groove is located on a side of the first accommodating groove distal to the accommodating cavity, a groove wall of the first accommodating groove on a side proximal to the accommodating cavity is a groove bottom wall, the conductive part is connected to the groove bottom wall to form a first connecting part, and an orthographic projection of the liquid injection hole on the groove bottom wall and an orthographic projection of the first connecting part on the groove bottom wall are disposed in a staggered manner.

In the above technical solutions, the electrolytic solution injected from the liquid injection hole can keep away from the first connecting part between the conductive part and the post terminal body as much as possible, thereby reducing contamination and corrosion caused by the electrolytic solution to the first connecting part.

In some embodiments, the communication hole on which the conductive part is disposed in a penetrating manner is the first communication hole, the post terminal body is formed as an elongated strip structure, and the first communication hole is formed as an elongated strip hole having a length direction extending from one end of a length of the post terminal body to the other end of the length.

In the above technical solutions, the space of the post terminal body can be fully utilized to increase the length of the first communication hole as much as possible, such that the first communication hole can pass through the conductive part with a larger dimension, which is beneficial to increasing the dimension of the conductive part, thereby increasing the current passage efficiency. When the first communication hole serves as the liquid transfer hole, increasing the length of the first communication hole is also beneficial to increasing the liquid injection efficiency.

In some embodiments, the post terminal cover plate is an elongated cover plate, and the liquid injection hole is eccentrically disposed in a length direction of the post terminal cover plate.

In the above technical solutions, the liquid injection hole can avoid the conductive part as much as possible, thereby reducing the contamination and corrosion caused by the injected electrolytic solution to the first connecting part between the conductive part and the post terminal body.

In some embodiments, the communication holes on which the conductive parts are disposed in a penetrating manner are first communication holes, a plurality of the first communication holes and a plurality of the conductive parts are provided, and each of the first communication holes is provided with at least one of the conductive parts in a penetrating manner.

In the above technical solutions, the problem that the dimension of a single first communication hole is relatively large, resulting in weak local strength of the post terminal body can be mitigated. Moreover, if the first communication hole serves as the liquid transfer hole, increasing the number of first communication holes is also beneficial to increasing the liquid injection efficiency.

In some embodiments, the battery cell includes a battery cell assembly, the battery cell assembly including an active substance-coated part received in the accommodating cavity and a conductive part connected to the active substance-coated part, where the conductive part is connected to a wall surface of the post terminal body on a side facing the accommodating cavity.

In the above technical solutions, the conductive part is connected to the wall surface of the post terminal body on the side facing the accommodating cavity, such that the conductive part does not pass through the communication hole and does not extend into the first accommodating groove, thereby reducing the contamination and corrosion caused by the injected electrolytic solution to the first connecting part between the conductive part and the post terminal body.

In some embodiments, the communication channel further includes a second accommodating groove, the second accommodating groove being located on the side of the first accommodating groove proximal to the accommodating cavity, and the second accommodating groove opening toward a direction of the accommodating cavity to be in communication with the accommodating cavity; the liquid transfer hole penetrates through a groove wall of the second accommodating groove to communicate the first accommodating groove with the second accommodating groove.

In the above technical solutions, the second accommodating groove can have the function of buffering the electrolytic solution or gas. When the battery cell is injected with a liquid, the second accommodating groove can be utilized to buffer the electrolytic solution, thereby mitigating problems such as splashing and overflow of the electrolytic solution. When the battery cell operates, the electrolytic solution participates in the reaction and then gas is generated. The second accommodating groove can be utilized to buffer the electrolytic solution or gas generated in the accommodating cavity, thereby mitigating the problem of overflow of the electrolytic solution or excessive air pressure in the accommodating cavity, and thus improving the reliability of the battery cell.

In some embodiments, the liquid injection hole is disposed opposite to the liquid transfer hole.

In the above technical solutions, the electrolytic solution injected from the liquid injection hole can directly flow in the direction of the liquid transfer hole disposed opposite to the liquid injection hole, such that liquid injection can be achieved more quickly and efficiently, and the liquid injection efficiency is increased.

In some embodiments, the post terminal cover plate is at least partially embedded in the first accommodating groove.

In the above technical solutions, by at least partially embedding the post terminal cover plate in the first accommodating groove, the space occupied by the post terminal cover plate outside the post terminal body can be reduced, thus improving the structural compactness.

In some embodiments, an edge of the post terminal cover plate is provided with a lap joint part, the lap joint part overlapping a side of the post terminal body distal to the accommodating cavity.

In the above technical solutions, the mating and connection between the post terminal cover plate and the post terminal body are facilitated, and the height of the empty cavity between the post terminal cover plate and the groove wall of the first accommodating groove is easily controlled, such that the volume of the empty cavity meets the design demands. In addition, when the lap joint part is welded to the post terminal body and the post terminal body is provided with the liquid transfer hole, the lap joint part can be away from the liquid transfer hole. When the electrolytic solution overflows from the liquid transfer hole, the electrolytic solution can be away from the welding joint between the lap joint part and the post terminal body, thereby mitigating problems such as corrosion and contamination to the welding joint.

In some embodiments, an edge of the post terminal cover plate is provided with a lap joint part, a surface of the post terminal body on a side distal to the accommodating cavity is provided with a recess disposed around the first accommodating groove, and the lap joint part is at least partially embedded in the recess.

In the above technical solutions, the recess can be used for positioning to increase the assembly efficiency of the post terminal body and the post terminal cover plate. Moreover, the recess can be used for limiting to a certain extent to improve the stability and the reliability of the mating between the post terminal body and the post terminal cover plate. In addition, by providing the recess, the post terminal cover plate can be further embedded into the post terminal body, such that the post terminal cover plate protrudes less or does not protrude from the post terminal body, which is beneficial to reducing the space occupation outside the post terminal body.

In some embodiments, a mating gap is formed between the lap joint part and a side wall of the recess, and a dimension W of the mating gap at an end distal to the accommodating cavity is less than 0.05 mm.

In the above technical solutions, in one aspect, the lap joint part of the post terminal cover plate can be smoothly assembled with the recess of the post terminal body; in another aspect, the mating gap between the two is not too large. When the lap joint part and the post terminal body are connected by welding, the welding pass rate of the lap joint part and the post terminal body can be improved.

In some embodiments, the liquid injection hole is formed on a post terminal cover plate of a cathode, and the post terminal cover plate of the cathode is made of a same material as a post terminal body of the cathode.

In the above technical solutions, when the liquid injection hole is formed on the post terminal cover plate of the cathode, the electrolytic solution flows to the welding joint between the post terminal cover plate of the cathode and the post terminal body of the cathode. Because the welding joint is usually made of a combination of the same material, the welding joint is not easily corroded, which is beneficial to improving the connection reliability between the post terminal cover plate and the post terminal body.

In some embodiments, the post terminal cover plate includes a first cover plate part and a second cover plate part, the first cover plate part being made of a same material as the post terminal body, the first cover plate part being connected to the post terminal body, and the second cover plate part being connected to the first cover plate part; the liquid injection hole is formed on the first cover plate part or the second cover plate part.

In the above technical solutions, when the liquid injection hole is formed on the post terminal cover plate made of a composite material, and when the first cover plate part and the post terminal body are made of the same material, the electrolytic solution flows to the welding joint between the first cover plate part and the post terminal body. Because the welding joint is made of a combination of the same material, the welding joint is not easily corroded, which is beneficial to improving the connection reliability between the post terminal cover plate and the post terminal body.

In some embodiments, a liquid inlet end of the liquid injection hole has a greater liquid passage area than a liquid outlet end of the liquid injection hole.

In the above technical solutions, when the electrolytic solution is injected into the liquid injection hole, the electrolytic solution flows in a direction from the liquid inlet end to the liquid outlet end, and the liquid passage area of the liquid inlet end of the liquid injection hole is set to be greater than that of the liquid outlet end of the liquid injection hole, so as to facilitate the mating between the liquid injection hole and a liquid injection nozzle, for example, facilitate the insertion of the liquid injection nozzle into the liquid inlet end of the liquid injection hole, which is beneficial to reducing the probability of liquid leakage during electrolytic solution injection. Moreover, since the liquid inlet end of the liquid injection hole has a relatively large liquid passage area, it is convenient to install a sealing structure to achieve the sealing of the liquid injection hole.

In some embodiments, the liquid injection hole includes a first hole segment and a second hole segment, where the first hole segment is located upstream of the second hole segment along a liquid injection flow direction, a liquid passage area of the first hole segment gradually decreases or remains unchanged along a direction from the first hole segment to the second hole segment, a liquid passage area of the second hole segment gradually decreases or remains unchanged along the direction from the first hole segment to the second hole segment, and a liquid passage area of an outlet end of the first hole segment is greater than or equal to a liquid passage area of an inlet end of the second hole segment.

In the above technical solutions, the liquid passage area of the first hole segment is relatively large, such that the first hole segment can conveniently mate with the liquid injection nozzle. Moreover, the first hole segment can play a role in buffering the electrolytic solution, which is beneficial to increasing the liquid injection efficiency and reducing the risks of splashing and overflow of the electrolytic solution. Moreover, it is convenient to assemble the sealing structure into the liquid injection hole to achieve reliable sealing of the liquid injection hole after liquid injection.

In some embodiments, the liquid injection hole is composed of the first hole segment and the second hole segment, the liquid passage area of the first hole segment gradually decreases along the direction from the first hole segment to the second hole segment, and the liquid passage area of the outlet end of the first hole segment is equal to the liquid passage area of the inlet end of the second hole segment.

In the above technical solutions, the liquid injection hole is of a two-segment type, the first hole segment is substantially funnel-shaped, and the side wall of the first hole segment can have a channeling effect, such that the electrolytic solution entering the first hole segment can flow quickly in the direction of the second hole segment, thereby increasing the liquid injection efficiency. In addition, because the liquid passage area of the outlet end of the first hole segment is equal to the liquid passage area of the inlet end of the second hole segment, no step surface is formed between the first hole segment and the second hole segment, together with the funnel shape of the first hole segment, such that liquid accumulation is not easy to form in the first hole segment.

In some embodiments, the liquid injection hole further includes a third hole segment, where the third hole segment is located between the first hole segment and the second hole segment along the liquid injection flow direction; a liquid passage area of the third hole segment gradually decreases along the direction from the first hole segment to the second hole segment, a liquid passage area of an inlet end of the third hole segment is less than or equal to the liquid passage area of the outlet end of the first hole segment, and a liquid passage area of an outlet end of the third hole segment is equal to the liquid passage area of the inlet end of the second hole segment.

In the above technical solutions, when the electrolytic solution is injected into the liquid injection hole, the electrolytic solution firstly flows through the first hole segment, then flows through the third hole segment, and then flows through the second hole segment, and the liquid passage area of the inlet end of the third hole segment is less than or equal to the liquid passage area of the outlet end of the first hole segment, thereby indicating that the liquid passage area of the first hole segment is relatively large, such that the first hole segment can conveniently mate with the liquid injection nozzle. Moreover, the first hole segment can play a role in buffering the electrolytic solution, which is beneficial to increasing the liquid injection efficiency and reducing the risks of splashing and overflow of the electrolytic solution. Moreover, it is convenient to assemble the sealing structure into the liquid injection hole to achieve reliable sealing of the liquid injection hole after liquid injection. In addition, because the liquid passage area of the third hole segment gradually decreases along the direction from the first hole segment to the second hole segment, the third hole segment is generally funnel-shaped, and the side wall of the third hole segment can have a channeling effect, such that the electrolytic solution entering the third hole segment can quickly flow in the direction of the second hole segment, thereby increasing the liquid injection efficiency. In addition, because the liquid passage area of the outlet end of the third hole segment is equal to the liquid passage area of the inlet end of the second hole segment, no step surface is formed between the third hole segment and the second hole segment, together with the funnel shape of the third hole segment, such that liquid accumulation is not easy to form in the third hole segment.

In some embodiments, the battery cell further includes: a sealing structure, the sealing structure mating with the post terminal cover plate and sealing the liquid injection hole.

In the above technical solutions, the sealing structure is provided to ensure the sealing performance of the liquid injection hole, prevent the electrolytic solution from overflowing, and prevent external foreign matters from entering the accommodating cavity via the liquid injection hole, thereby improving the reliability of the battery cell.

In some embodiments, the sealing structure includes: a first sealing member, the first sealing member being at least partially embedded in the liquid injection hole, and the first sealing member being in interference fit with the liquid injection hole and sealing the liquid injection hole.

In the above technical solutions, the first sealing member is fixed in an interference fit manner, thereby facilitating quick installation of the first sealing member and improving the sealing reliability of the first sealing member for the liquid injection hole.

In some embodiments, the sealing structure includes: a second sealing member, where the liquid inlet end of the liquid injection hole is lidded with the second sealing member, and the second sealing member is in sealing connection to the post terminal cover plate.

In the above technical solutions, sealing can be implemented from a source of the liquid injection hole, such that the probability of contaminating the liquid injection hole with foreign matters can be reduced. In addition, the liquid inlet end of the liquid injection hole is lidded with the second sealing member, such that rapid assembly of the second sealing member is facilitated, thus increasing the assembly efficiency of the second sealing member.

In some embodiments, the liquid injection hole includes a first hole segment and a second hole segment sequentially disposed along a liquid injection flow direction, a hole diameter of the first hole segment is greater than a hole diameter of the second hole segment, and the second sealing member is at least partially embedded in the first hole segment and covers the second hole segment.

In the above technical solutions, the portion of the second sealing member embedded in the first hole segment can cover the second hole segment, such that the liquid injection hole can be reliably sealed. In addition, because the hole diameter of the first hole segment is relatively large, the second sealing member is at least partially embedded in the first hole segment, which facilitates the assembly and positioning of the second sealing member, thereby eliminating the need for a positioning fixture and the like for connection, and facilitating the connection between the second sealing member and the post terminal cover plate. Moreover, the space occupied by the second sealing member outside the post terminal cover plate can be reduced, which is beneficial to reducing the overall dimension of the battery cell.

In some embodiments, an edge of the second sealing member is in sealing connection to a hole wall of the first hole segment.

In the above technical solutions, the edge of the second sealing member is connected to the hole wall of the first hole segment, which indicates that the second sealing member can be completely received in the first hole segment in the radial direction of the first hole segment, which is beneficial to further reducing the space occupied by the second sealing member outside the post terminal cover plate and improving the compactness of the fit between the second sealing member and the post terminal cover plate. In addition, the stability and the reliability of the connection between the second sealing member and the post terminal cover plate can be improved by using the hole wall of the first hole segment to stop and limit the edge of the second sealing member.

In some embodiments, the second sealing member includes an extension part, the extension part extending to an outside of the first hole segment, and overlapping and being in sealing connection to a wall surface of the post terminal cover plate on a side distal to the accommodating cavity.

In the above technical solutions, it is beneficial to increasing the connection area between the second sealing member and the post terminal cover plate, thereby improving the connection reliability between the second sealing member and the post terminal cover plate. In addition, there is a relatively low requirement for the shape of the first hole segment, and there is no need to set the edge of the second sealing member to be in clearance fit with the hole wall of the first hole segment that matches the shape and meets the requirement. This reduces the machining precision of the post terminal cover plate and the second sealing member, increases the production efficiency, and reduces the production costs.

In some embodiments, the liquid injection hole forms a step surface at a joint between the first hole segment and the second hole segment, and a portion of the second sealing member embedded in the first hole segment is supported on the step surface.

In the above technical solutions, the portion of the second sealing member embedded in the first hole segment is supported on the step surface, such that the connection stability between the second sealing member and the post terminal cover plate can be improved.

In some embodiments, the sealing structure includes: a first sealing member, the first sealing member being in interference sealing fit with the second hole segment and located on a side of the second sealing member proximal to the accommodating cavity.

In the above technical solutions, the sealing structure includes both the first sealing member and the second sealing member. The second sealing member can prevent the first sealing member from falling out of the liquid injection hole, improve the reliability of the sealing fit between the first sealing member and the second hole segment, and further improve the sealing reliability of the sealing structure as a whole for the liquid injection hole. In addition, the first sealing member is fixed in an interference fit manner, thereby facilitating quick installation of the first sealing member.

In some embodiments, the second sealing member includes a clearance part protruding in a direction distal to the first sealing member, a side of the clearance part facing the first sealing member forms a clearance cavity, and a portion of the first sealing member extends into the clearance cavity.

In the above technical solutions, the compactness of the fit between the first sealing member and the second sealing member can be improved, and the occupation and waste of the space can be reduced, thus reducing the volume of the battery cell. In addition, the second sealing member is in a concave-convex form, such that the structural strength of the second sealing member can be improved, and the reliability and the stability of mating between the second sealing member and the post terminal cover plate can be improved.

In some embodiments, the second sealing member includes a central part and an edge part disposed around the central part, the central part being embedded in the liquid injection hole, and the edge part overlapping and being in sealing connection to a portion of a wall surface of the post terminal cover plate on a side distal to the accommodating cavity surrounding the liquid injection hole.

In the above technical solutions, the shape of the liquid injection hole is less demanding, and the post terminal cover plate does not need to be thickened in order to machine the liquid injection hole into a complex shape, such that the post terminal cover plate can be thinned. Moreover, the positioning of and the mating between the second sealing member and the post terminal cover plate are stable, which is beneficial to improving the connection stability and the reliability between the second sealing member and the post terminal cover plate. In addition, the mating between the second sealing member and the post terminal cover plate is compact, which is beneficial to saving space. In addition, the manner in which the second sealing member is overlapped with and connected to the post terminal cover plate facilitates quick connection therebetween.

In some embodiments, the housing includes a first housing wall, and the post terminal bodies are disposed on the first housing wall, where the first housing wall is an integrally formed cover plate, or, the first housing wall and at least one second housing wall are integrally formed, and the second housing wall extends toward a side in a thickness direction of the first housing wall.

In the above technical solutions, the flexible design of the position of the post terminal can be achieved, thereby expanding the application range of the battery cell.

In a second aspect, the embodiments of the present application further provide a battery, which includes busbar components and the battery cells according to any one of the above solutions, where a plurality of the battery cells are provided and at least two of the battery cells are electrically connected by the corresponding busbar component.

In the above technical solutions, both the performance and manufacturability of the battery cell according to the embodiments of the present application are improved, thereby facilitating the improvement of the performance and manufacturability of the battery.

In some embodiments, the busbar component is connected to a surface of the post terminal cover plate on a side distal to the accommodating cavity to form a second connecting part, and the liquid injection hole and the second connecting part are disposed in a staggered manner.

In the above technical solutions, when the electrolytic solution overflows from the liquid injection hole, it can reduce the contamination and corrosion caused by the electrolytic solution to the second connecting part, and avoid the influence of the sealing structure with which the liquid injection hole is lidded on the connection between the busbar component and the post terminal cover plate, and improve the convenience and reliability of the connection between the busbar component and the post terminal cover plate.

In some embodiments, a boundary part is formed on the surface of the post terminal cover plate on the side distal to the accommodating cavity, and the boundary part is located between the second connecting part and the liquid injection hole.

In the above technical solutions, the boundary part is of a concave structure or a convex structure. When the electrolytic solution overflows from the liquid injection hole, it can be blocked by the boundary part to reduce the probability that the electrolytic solution is in contact with the second connecting part, thereby reducing the contamination and corrosion caused by the electrolytic solution to the second connecting part. In addition, by providing the boundary part, it can play the role of identification, such that a connection position between the busbar component and the post terminal cover plate can be far away from the liquid injection hole, thereby further reducing the possibility that the electrolytic solution overflowing from the liquid injection hole is in contact with the second connecting part.

In a third aspect, the embodiments of the present application further provide an electric device, which includes the battery according to any one of the above solutions.

In the above technical solutions, because the performance of the battery is improved, it helps to improve the operational electrical performance of the electric device.

BRIEF DESCRIPTION OF THE DRAWINGS

To more clearly illustrate the technical solutions in embodiments of the present application, the drawings required for use in the embodiments will be briefly described below. It should be understood that the following drawings only illustrate some embodiments of the present application and therefore should not be considered as limiting the scope of the present application, and other related drawings can be derived from these drawings by those of ordinary skill in the art without creative efforts.

Figure 1:
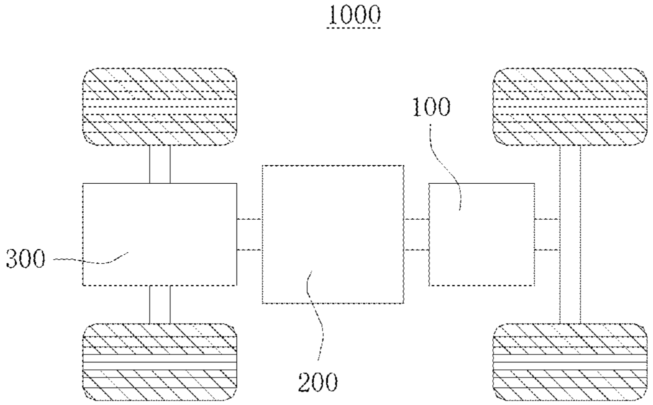
FIG. 1 is a structural schematic diagram of a vehicle according to some embodiments of the present application.

Reference numerals: vehicle 1000; first direction X; second direction Y; third direction Z; battery 100; controller 200; motor 300; case 101; first case body 1011; second case body 1012; battery cell 102; post terminal 1020; housing 1; accommodating cavity 1A; first housing wall 11; second housing wall 12; post terminal body 2; communication channel 2A; first accommodating groove 211; groove bottom wall 2110; second accommodating groove 212; communication hole 22; first communication hole 221; second communication hole 222; liquid transfer hole 23; recess 25; mating gap 26; outer stopper part 271; inner stopper part 272; sealing structure 1022; post terminal cover plate 3; liquid injection hole 31; liquid inlet end 31*a*; liquid outlet end 31*b*; first hole segment 311; second hole segment 312; third hole segment 313; step surface 314; lap joint part 32; first cover plate part 331; second cover plate part 332; boundary part 34; first sealing member 4; second sealing member 5; extension part 51; central part 52; edge part 53; clearance part 54; clearance cavity 55; sealing gasket 1023; insulating gasket 1024; battery cell assembly 7; active substance-coated part 71; conductive part 72; first connecting part 73; busbar component 103; second connecting part 104.

DETAILED DESCRIPTION

To make the objectives, technical solutions, and advantages of embodiments of the present application clearer, the technical solutions in the embodiments of the present application will be clearly described hereinafter with reference to the drawings in the embodiments of the present application. It is obvious that the described embodiments are some, but not all, embodiments of the present application. Based on the embodiments in the present application, all other embodiments obtained by those of ordinary skill in the art without creative work shall fall within the protection scope of the present application.

Unless otherwise defined, all technical and scientific terms used in the present application have the same meaning as commonly understood by those of ordinary skill in the art to which the present application belongs. The terms used in the specification of the present application are only used to describe specific embodiments and are not intended to limit the present application. The terms "include", "comprise", "have", "provided with" and any variants thereof in the specification and claims of the present application and the above description of the drawings are intended to cover a non-exclusive inclusion. The terms "first", "second", and the like in the specification and claims of the present application and the above drawings are used to distinguish different objects and are not intended to describe a specific order or priority.

Reference in the present application to "embodiment" means that a particular feature, structure, or characteristic described in combination with the embodiment can be included in at least one embodiment of the present application. The references of the word in the context of the specification do not necessarily refer to the same embodiment, nor to separate or alternative embodiments exclusive of other embodiments.

In the description of the present application, it should be noted that unless otherwise explicitly specified or limited, the terms "install", "link", "connect", and "attach" shall be construed broadly and may be, for example, fixed connection, detachable connection, or integrated connection, or direct connection, indirect connection via an intermediate, or internal communication between two elements. For those of ordinary skill in the art, the specific meanings of the aforementioned terms in the present application can be understood according to specific conditions.

In the present application, the term "and/or" is only an association relationship that describes the associated objects, and indicates that there may be three relationships. For example, A and/or B may indicate that: only A is present, both A and B are present, and only B is present. In addition, the character "/" in the present application generally indicates an "or" relationship between the associated objects before and after the "/".

In the embodiments of the present application, the same reference numerals represent the same components, and for the sake of brevity, detailed descriptions of the same components are omitted in different embodiments. It should be understood that the thickness, length, width, and other dimensions of various components in the embodiments of the present application shown in the drawings, as well as the overall thickness, length, width, and other dimensions of the integrated device are only exemplary and should not impose any limitation on the present application.

The term "plurality of" used in the present application refers to more than two (including two).

In the present application, battery cells may include lithium-ion secondary batteries, lithium-ion primary batteries, lithium-sulfur batteries, sodium-lithium-ion batteries, sodium-ion batteries, magnesium-ion batteries, etc. This is not limited in the embodiments of the present application. The battery cell may be cylindrical, flat, rectangular parallelepiped-shaped, or in other shapes, which is also not limited in the embodiments of the present application. According to the packaging method, battery cells are typically divided into three types: cylindrical battery cells, square battery cells, and pouch battery cells, which are not limited in the embodiments of the present application.

The battery mentioned in the embodiments of the present application refers to a single physical module including one or a plurality of battery cells to provide higher voltage and capacity. For example, the battery mentioned in the present application may include a battery module, a battery pack, or the like. A battery module group generally includes a plurality of battery cells. A battery pack generally includes a case configured to encapsulate one or a plurality of battery cells or one or a plurality of battery module groups. The case can prevent liquid or other foreign matters from affecting the charging or discharging of the battery cells.

The battery cell includes a housing, a battery cell assembly, and an electrolytic solution, where the housing is configured to accommodate the battery cell assembly and the electrolytic solution. The battery cell assembly includes at least one electrode assembly, where the electrode assembly is composed of a positive electrode plate, a negative electrode plate, and a separator, and the electrode assembly may be of a wound structure, a stacked structure, or the like. A battery cell primarily works by the movement of metal ions between the positive electrode plate and the negative electrode plate.

The positive electrode plate may generally include a positive electrode current collector and a positive electrode active substance layer. The positive electrode active substance layer is directly or indirectly applied onto the positive electrode current collector. The positive electrode current collector not coated with the positive electrode active substance layer protrudes from the positive electrode current collector coated with the positive electrode active substance layer. The positive electrode current collector not coated with the positive electrode active substance layer serves as a positive electrode tab. Taking lithium-ion batteries as an example, a material of the positive electrode current collector may be aluminum, and a material of the positive electrode active substance layer may be lithium cobaltate, lithium iron phosphate, ternary lithium, lithium manganate, or the like.

The negative electrode plate may generally include a negative electrode current collector and a negative electrode active substance layer. The negative electrode active substance layer is directly or indirectly applied onto the negative electrode current collector, the negative electrode current collector not coated with the negative electrode active substance layer protrudes from the negative electrode current collector coated with the negative electrode active substance layer, and the negative electrode current collector not coated with the negative electrode active substance layer serves as a negative electrode tab. The material of the negative electrode current collector may be copper, and the material of the negative electrode active substance layer may be carbon, silicon, or the like.

In order to ensure the passing of a large current without fusing, a plurality of positive electrode tabs are provided and are stacked together to form a tab part of the positive electrode, and a plurality of negative electrode tabs are provided and are stacked together to form a tab part of the negative electrode. Post terminals are disposed on the housing. The tab part of the positive electrode is electrically connected to the post terminal of the positive electrode, and the tab part of the negative electrode is electrically connected to the post terminal of the negative electrode. For example, the tab part may be welded to the post terminal to form a direct electrical connection between the tab part and the post terminal. For another example, the battery cell assembly may include an adapting piece, the tab part is welded to the adapting piece, and the adapting piece is welded to the post terminal to form an indirect electrical connection between the tab part and the post terminal.

The material of the separator is not limited, such as polypropylene or polyethylene.

In a battery cell in the related art, post terminals, an explosion-proof valve, and the like are usually disposed on a top cover of a housing, and a liquid injection hole is also formed on the top cover. The liquid injection hole is spaced apart from structural members such as the post terminals and the explosion-proof valve. Since the liquid injection hole is separately formed on the top cover, the area of the top cover is occupied, resulting in a smaller area of the post terminal. If the area of the post terminal needs to be increased, the dimension of the top cover needs to be increased, and the weight of the enlarged top cover also increases, making it difficult to achieve miniaturization and lightweight design of the top cover. In addition, since the liquid injection hole needs to be separately disposed on the top cover, the structure of the top cover is relatively complex, and thus the machining difficulty is relatively high. Therefore, the liquid injection hole is not easy to machine. In addition, for the sake of sealing performance, a sealing pin needs to be welded on the top cover to block the liquid injection hole. However, as the energy density of the battery cell increases, the top cover becomes thinner, and poor collapse or welding penetration is likely to occur at the position where the sealing pin is welded on the top cover. To mitigate this problem, the localized thickening is typically applied to the welding of the sealing pin on the top cover, resulting in an increase in the material and manufacturing costs of the top cover. Or, the entire top cover needs to be thickened, which fails to meet the requirements for lightness and thinness of the top cover and thus affects the increase in the energy density of the battery cell. In addition, in order to ensure the insulation at the sealing pin and avoid the interference between the sealing pin and the battery cell assembly in the housing, the lower plastic structure below the top cover needs to be thickened. The thickened lower plastic structure not only leads to higher material costs, but also occupies more space in the accommodating cavity, affecting the increase in the energy density of the battery cell.

Therefore, the embodiments of the present application provide a battery cell. The battery cell includes: a housing, post terminal bodies, and post terminal cover plates, where the housing defines an accommodating cavity; the post terminal bodies are disposed on the housing, and the post terminal body is provided with a communication channel in communication with the accommodating cavity; the post terminal body is lidded with the post terminal cover plate, and the post terminal cover plate is provided with a liquid injection hole in communication with the communication channel. Therefore, the liquid injection hole is formed on the post terminal cover plate, and the post terminal body provided with the communication channel is provided, such that an electrolytic solution is injected into a post terminal composed of the post terminal body and the post terminal cover plate, and there is no need to separately dispose the liquid injection hole on the housing of the battery cell. Therefore, the liquid injection hole does not separately occupy the space of the housing, and the post terminal does not need to be made small to avoid the liquid injection hole, so that the area and the liquid passage area of the post terminal can be increased without increasing the dimension of the housing, which is beneficial to reducing the flow resistance and increasing the current passage efficiency of the battery cell. Moreover, the area of the post terminal is increased, which is also beneficial to the assembly and connection of the post terminal and the housing. In addition, since it is not necessary to increase the dimension of the housing in order to increase the area of the post terminal, it is advantageous for achieving miniaturization and lightweight design of the housing.

In addition, there is no need to specially machine the housing in order to separately dispose the liquid injection hole on the housing. This helps to reduce the structural complexity and the machining difficulty of the housing. Moreover, there is no need to partially thicken the housing for welding a sealing pin to the housing, and thus the structure and machining of the housing can be further simplified, and there is also no need to thicken the housing as a whole for welding the sealing pin to the housing. Therefore, it is beneficial to meeting the requirements for lightness and thinness of the housing, increasing the energy density of the battery cell, and reducing the weight and material costs of the housing.

Moreover, in the battery cell according to the embodiments of the present application, the liquid injection hole is formed on the post terminal cover plate, such that the manufacturing and machining of the liquid injection hole can be facilitated, and the dimension, shape, and the like of the liquid injection hole can easily meet the design requirements and application demands, which is beneficial to reducing the machining difficulty of the liquid injection hole and reducing the machining cost of the liquid injection hole.

In addition, the liquid injection hole is formed on the post terminal cover plate, and the post terminal body is further disposed on the side of the post terminal cover plate proximal to the accommodating cavity. Therefore, even if the sealing pin is disposed at the liquid injection hole, the post terminal body is further sandwiched between the lower plastic structure and the sealing pin. Therefore, the lower plastic structure does not need to be thickened in order to ensure the insulation at the sealing pin, and the lower plastic structure does not need to be thickened in order to avoid the interference between a relatively long sealing pin and the battery cell assembly, which is beneficial to thinning of the lower plastic structure, reducing material costs, and reducing the space in the accommodating cavity occupied by the lower plastic structure, which is beneficial to increasing the energy density of the battery cell.

In addition, in the battery cell according to the embodiments of the present application, the liquid injection hole is formed on the post terminal cover plate, and the communication channel is disposed on the post terminal body at the same time, such that the liquid injection path can be extended to a certain extent, and the function of liquid injection buffer can be achieved to a certain extent, which is beneficial to reducing the possibility of splashing and overflow of the electrolytic solution during liquid injection or operation of the battery cell.

The embodiments of the present application provide an electric device using a battery as a power source. The electric device may be, but is not limited to, a mobile phone, a tablet, a laptop computer, an electric toy, an electric tool, an electric bicycle, an electric vehicle, a ship, a spacecraft, and the like. The electric toys may include stationary or mobile electric toys, such as game consoles, electric car toys, electric ship toys, or electric airplane toys. The spacecrafts may include airplanes, rockets, space shuttles, spaceships, etc.

For ease of description, the present application is illustrated by taking a vehicle 1000 as an example of the electric device according to an embodiment of the present application.

Referring to FIG. 1, FIG. 1 is a structural schematic diagram of a vehicle 1000 according to some embodiments of the present application. The vehicle 1000 may be a fuel vehicle, a gas vehicle or a new energy vehicle. The new energy vehicle may be a pure electric vehicle, a hybrid vehicle, an extended-range vehicle, or the like. A battery 100 is provided inside the vehicle 1000, and the battery 100 may be provided at the bottom, head, or tail of the vehicle 1000. The battery 100 may be configured to power the vehicle 1000. For example, the battery 100 may serve as an operation power source for the vehicle 1000. The vehicle 1000 may further include a controller 200 and a motor 300. The controller 200 is used for controlling the battery 100 to power the motor 300, e.g., for operation power needed by the vehicle 1000 for start-up, navigation, and driving.

In some embodiments of the present application, the battery 100 may not only serve as an operation power source for the vehicle 1000, but also serve as a driving power source for the vehicle 1000 to, instead of or in part instead of fuel or natural gas, provide driving power for the vehicle 1000.

Figure 2:
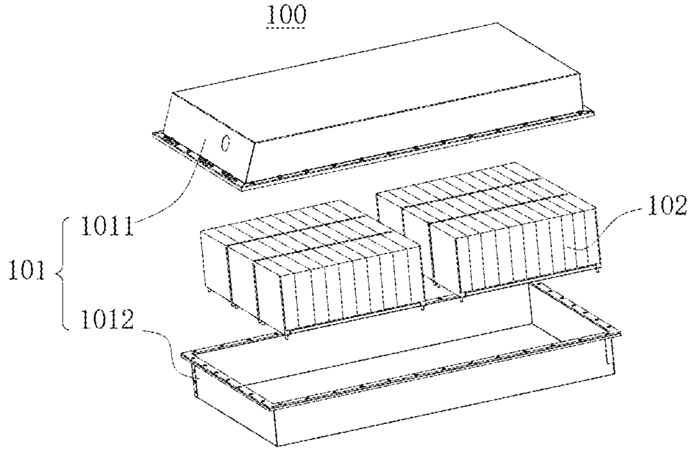
FIG. 2 is an exploded view of the structure of a battery according to some embodiments of the present application.

Referring to FIG. 2, FIG. 2 is an exploded view of the structure of a battery 100 according to some embodiments of the present application. The battery 100 includes a case 101 and a plurality of battery cells 102, and the battery cells 102 are accommodated in the case 101. The case 101 is configured to provide an assembly space for the battery cells 102, and the case 101 may be in various structures. In some embodiments, the case 101 may include a first case body 1011 and a second case body 1012. The first case body 1011 and the second case body 1012 are mutually lidded onto each other. The first case body 1011 and the second case body 1012 jointly define an assembly space for accommodating the battery cells 102. The second case body 1012 may be of a hollow structure with one end open, and the first case body 1011 may be of a plate-shaped structure. The first case body 1011 is lidded onto the open side of the second case body 1012, such that the first case body 1011 and the second case body 1012 jointly define an assembly space; the first case body 1011 and the second case body 1012 may also both be of a hollow structure with one side open, and the open side of the first case body 1011 is lidded onto the open side of the second case body 1012. Certainly, the case 101 formed by the first case body 1011 and the second case body 1012 may be in various shapes, such as a cylinder and a rectangular parallelepiped.

In the battery 100, the plurality of battery cells 102 may be connected in series, in parallel, or in series-parallel. The series-parallel connection means that both series connection and parallel connection are present for the connection among the plurality of battery cells 102. The plurality of battery cells 102 may be directly connected in series, in parallel, or in series-parallel, and then the whole formed by the plurality of battery cells 102 is accommodated in the case 101. Certainly, the situation may be that in the battery 100, the plurality of battery cells 102 are first connected in series, in parallel, or in series-parallel to form battery modules, and then the plurality of battery modules are connected in series, in parallel, or in series-parallel to form a whole and accommodated in the case 101. The battery 100 may further include other structures. For example, the battery 100 may further include busbar components configured to achieve electrical connection between the plurality of battery cells 102.

Figure 3:
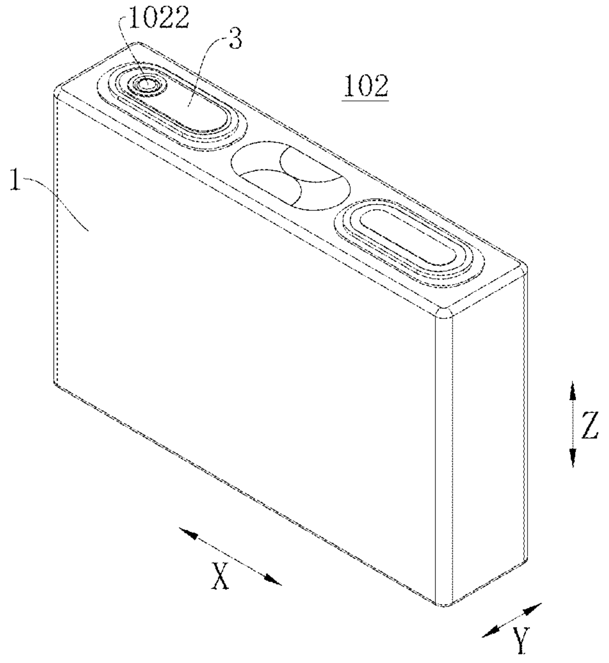
FIG. 3 is a structural schematic diagram of a battery cell according to some embodiments of the present application.

Each battery cell 102 may be a secondary battery or a primary battery; it may also be a lithium-sulfur battery, a sodium-ion battery, or a magnesium-ion battery, but is not limited thereto. The battery cell 102 may be cylindrical, flat, rectangular parallelepiped-shaped, etc. For example, referring to the embodiments shown in FIG. 3, the length direction of the battery cell 102 is a first direction X, the width direction of the battery cell 102 is a second direction Y, the height direction of the battery cell 102 is a third direction Z, and the first direction X, the second direction Y, and the third direction Z are perpendicular to each other.

Figure 4:
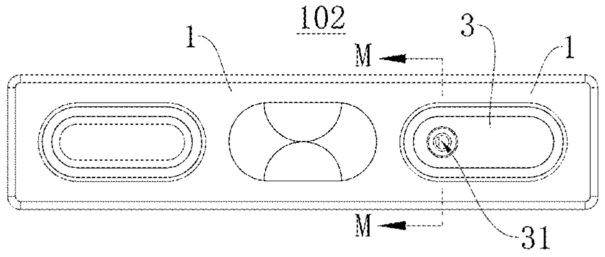
FIG. 4 is a schematic diagram of an orthographic projection of a battery cell according to some embodiments of the present application.
Figure 5:
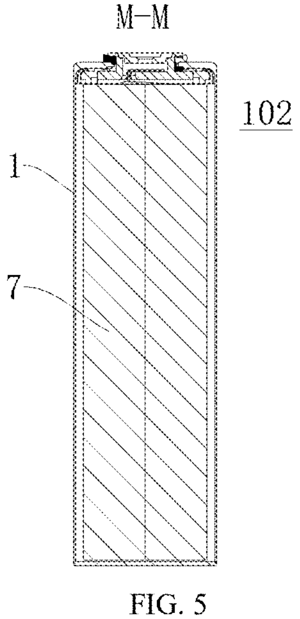
FIG. 5 is a cross-sectional view along line M-M in FIG. 4.
Figure 6:
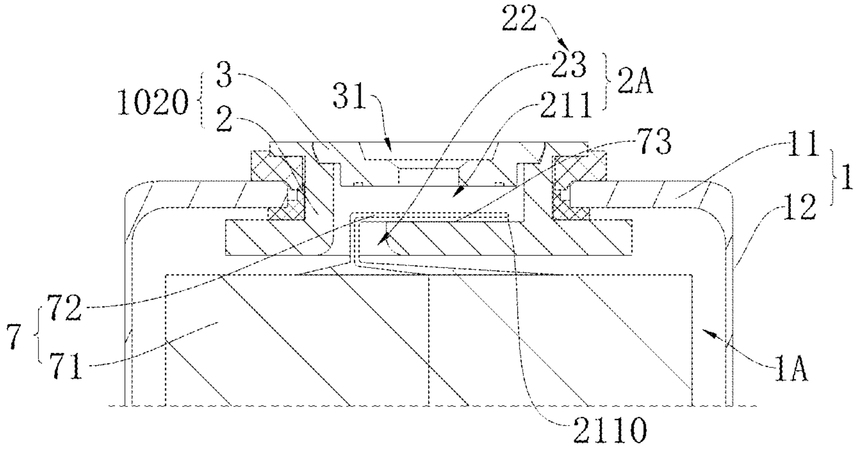
FIG. 6 is a partial enlarged view of FIG. 5.

According to some embodiments of the present application, referring to FIGS. 4-6, the battery cell 102 includes: a housing 1, post terminal bodies 2, and post terminal cover plates 3, where the housing 1 defines an accommodating cavity 1A; the post terminal bodies 2 are disposed on the housing 1, and the post terminal body 2 is provided with a communication channel 2A in communication with the accommodating cavity 1A; each post terminal body 2 is lidded with the corresponding post terminal cover plate 3, and the post terminal cover plate 3 is provided with a liquid injection hole 31 in communication with the communication channel 2A.

Since the post terminal body 2 is lidded with the post terminal cover plate 3, the liquid injection hole 31 is located upstream of the communication channel 2A in a liquid injection flow direction, that is, when an electrolytic solution is injected into the battery cell 102, the electrolytic solution first flows through the liquid injection hole 31 and then flows through the communication channel 2A. Therefore, when the battery cell 102 needs to inject the electrolytic solution into the accommodating cavity 1A, the electrolytic solution can be injected into the liquid injection hole 31. Since the liquid injection hole 31 is in communication with the communication channel 2A, the electrolytic solution entering the liquid injection hole 31 can flow into the communication channel 2A. Moreover, since the communication channel 2A is in communication with the accommodating cavity 1A, the electrolytic solution entering the communication channel 2A can flow into the accommodating cavity 1A, thereby achieving liquid injection into the accommodating cavity 1A via the liquid injection hole 31 and the communication channel 2A.

It should be noted that the positions where the post terminal bodies 2 are disposed on the housing 1 are not limited. For example, the housing 1 may include a first housing wall 11, and the post terminal bodies 2 may be disposed on the first housing wall 11. Illustratively, when the battery cell 102 needs to be injected with a liquid, the battery cell 102 can be placed such that the first housing wall 11 is located at the top of the housing 1. At this time, the post terminal bodies 2 are located at the top of the housing 1, the upper end of each post terminal body 2 is lidded with the corresponding post terminal cover plate 3, and the liquid injection hole 31 is located above the communication channel 2A. When the electrolytic solution is injected into the liquid injection hole 31, the electrolytic solution flows down from the liquid injection hole 31 into the communication channel 2A, and then flows down from the communication channel 2A into the accommodating cavity 1A, such that the convenience of liquid injection can be improved, and the probability of overflow and splashing of the electrolytic solution can be reduced. When the battery cell 102 operates, the liquid injection hole 31 can be sealed, and at this time, the housing 1 can be placed such that the first housing wall 11 can be located in any position of the housing 1. For example, when the battery cell 102 operates, the first housing wall 11 can be located at the top, at the bottom, on the side, etc., of the housing 1.

For the battery cell 102 according to the embodiments of the present application, the liquid injection hole 31 is formed on the post terminal cover plate 3, and the post terminal body 2 provided with the communication channel 2A is provided, such that an electrolytic solution is injected into a post terminal 1020 composed of the post terminal body 2 and the post terminal cover plate 3, and there is no need to separately dispose the liquid injection hole 31 on the housing 1 of the battery cell 102. Therefore, the liquid injection hole 31 does not separately occupy the space of the housing 1, and the post terminal 1020 does not need to be made small to avoid the liquid injection hole 31, so that the area and the liquid passage area of the post terminal 1020 can be increased without increasing the dimension of the housing 1, which is beneficial to reducing the flow resistance and increasing the current passage efficiency of the battery cell 102. Moreover, the area of the post terminal 1020 is increased, which is also beneficial to the assembly and connection of the post terminal 1020 and the housing 1. In addition, since it is not necessary to increase the dimension of the housing 1 in order to increase the area of the post terminal 1020, it is advantageous for achieving miniaturization and lightweight design of the housing 1.

In addition, there is no need to specially machine the housing 1 in order to separately dispose the liquid injection hole 31 on the housing 1. This helps to reduce the structural complexity and the machining difficulty of the housing 1. Moreover, there is no need to partially thicken the housing 1 for welding a sealing pin to the housing 1, and thus the structure and machining of the housing 1 can be further simplified, and there is also no need to thicken the housing 1 as a whole for welding the sealing pin to the housing 1. Therefore, it is beneficial to meeting the requirements for lightness and thinness of the housing 1, increasing the energy density of the battery cell 102, and reducing the weight and material costs of the housing 1.

Moreover, in the battery cell 102 according to the embodiments of the present application, the liquid injection hole 31 is formed on the post terminal cover plate 3, such that the manufacturing and machining of the liquid injection hole 31 can be facilitated, and the dimension, shape, and the like of the liquid injection hole 31 can easily meet the design requirements and application demands, which is beneficial to reducing the machining difficulty of the liquid injection hole 31 and reducing the machining cost of the liquid injection hole 31.

In addition, the liquid injection hole 31 is formed on the post terminal cover plate 3, and the post terminal body 2 is further disposed on the side of the post terminal cover plate 3 proximal to the accommodating cavity 1A. Therefore, even if the sealing pin is disposed at the liquid injection hole 31, the post terminal body 2 is further sandwiched between the lower plastic structure and the sealing pin. Therefore, the lower plastic structure does not need to be thickened in order to ensure the insulation at the sealing pin, and the lower plastic structure does not need to be thickened in order to avoid the interference between a relatively long sealing pin and the battery cell assembly 7, which is beneficial to thinning of the lower plastic structure, reducing material costs, and reducing the space in the accommodating cavity 1A occupied by the lower plastic structure, which is beneficial to increasing the energy density of the battery cell 102.

In addition, in the battery cell 102 according to the embodiments of the present application, the liquid injection hole 31 is formed on the post terminal cover plate 3, and the communication channel 2A is disposed on the post terminal body 2 at the same time, such that the liquid injection path can be extended to a certain extent, and the function of liquid injection buffer can be achieved to a certain extent, which is beneficial to reducing the possibility of splashing and overflow of the electrolytic solution during liquid injection or operation of the battery cell 102.

In some embodiments, as shown in FIG. 6, the communication channel 2A includes a first accommodating groove 211 and a liquid transfer hole 23, the first accommodating groove 211 opening toward a direction of the post terminal cover plate 3 to be in communication with the liquid injection hole 31, and the liquid transfer hole 23 penetrating through a groove wall of the first accommodating groove 211 and communicating the first accommodating groove 211 with the accommodating cavity 1A.

Illustratively, the communication channel 2A includes a first accommodating groove 211 and a liquid transfer hole 23, the first accommodating groove 211 opening toward a direction of the post terminal cover plate 3 (i.e., toward a side of the first accommodating groove 211 distal to the accommodating cavity 1A), such that the first accommodating groove 211 is in communication with the liquid injection hole 31. The liquid transfer hole 23 penetrates through a groove wall of the first accommodating groove 211 on a side distal to the post terminal cover plate 3 (i.e., the liquid transfer hole 23 is located on a side of the first accommodating groove 211 proximal to the accommodating cavity 1A and penetrates through a groove wall of the first accommodating groove 211 on a side proximal to the accommodating cavity 1A), such that the liquid transfer hole 23 communicates the first accommodating groove 211 with the accommodating cavity 1A. Or, the liquid transfer hole 23 may also penetrate through a groove wall at another position of the first accommodating groove 211, as long as the first accommodating groove 211 can be in communication with the accommodating cavity 1A.

When the battery cell 102 needs to inject the electrolytic solution into the accommodating cavity 1A, the electrolytic solution can be injected into the liquid injection hole 31. Since the liquid injection hole 31 is in communication with the first accommodating groove 211, the electrolytic solution entering the liquid injection hole 31 can flow into the first accommodating groove 211. Moreover, since the first accommodating groove 211 is in communication with the accommodating cavity 1A via the liquid transfer hole 23, the electrolytic solution entering the first accommodating groove 211 can flow into the accommodating cavity 1A via the liquid transfer hole 23, thereby achieving liquid injection into the accommodating cavity 1A via the liquid injection hole 31, the first accommodating groove 211, and the liquid transfer hole 23.

Therefore, since the communication channel 2A includes the first accommodating groove 211 formed on the post terminal body 2, the first accommodating groove 211 can act to buffer the electrolytic solution, and during the liquid injection or operation of the battery cell 102, the problems of splashing, overflow, etc. of the electrolytic solution can be mitigated. In addition, when the electrolytic solution is injected, because the first accommodating groove 211 can buffer the electrolytic solution, the electrolytic solution injection efficiency is increased, and the groove side wall of the first accommodating groove 211 (that is, a groove wall extending from the open side of the first accommodating groove 211 toward the accommodating cavity 1A) can prevent the electrolytic solution from splashing out to some extent, thereby reducing external contamination caused by the electrolytic solution.

In addition, it should be noted that when the communication channel 2A includes the first accommodating groove 211, the liquid transfer hole 23 may be formed on the side of the first accommodating groove 211 proximal to the accommodating cavity 1A and penetrate through the groove wall of the first accommodating groove 211 on the side proximal to the accommodating cavity 1A. At this time, the first accommodating groove 211 is equivalent to a sunken structure, such that the liquid transfer hole 23 is away from the opening of the first accommodating groove 211, and the liquid transfer hole 23 is relatively far from the joint between the post terminal cover plate 3 and the post terminal body 2. When the electrolytic solution overflows from the liquid transfer hole 23, the overflow electrolytic solution is not easy to be in contact with the connection position (such as welding or bonding) between the post terminal cover plate 3 and the post terminal body 2, which can reduce corrosion, contamination and the like to the connection position.

In some embodiments of the present application, the cross-sectional shape of the first accommodating groove 211 matches the cross-sectional shape of the post terminal body 2. Therefore, the space of the post terminal body 2 can be fully utilized to make the dimension of the first accommodating groove 211 as large as possible, which is beneficial to improving the functions of buffering, housing, and the like of the first accommodating groove 211.

Certainly, the present application is not limited thereto. For example, in some embodiments of the present application, the post terminal body 2 may not be provided with the first accommodating groove 211, but is only provided with the liquid transfer hole 23, and the liquid injection hole 31 is opposite to and in communication with the liquid transfer hole 23, such that the liquid injection demand can also be met.

In some embodiments, the battery cell 102 further includes a battery cell assembly 7, the battery cell assembly 7 including an active substance-coated part 71 and a conductive part 72; the active substance-coated part 71 is received in the accommodating cavity 1A, and the conductive part 72 is connected to the active substance-coated part 71. Illustratively, the conductive part 72 may be connected to the post terminal 1020 to form an electrical connection, thereby enabling electrode output of the battery cell assembly 7 from the post terminal 1020. For example, the conductive part 72 may be connected to the post terminal 1020 via welding or other methods to achieve the connection. It can be understood that the active substance-coated part 71 may include a current collector coated with an active substance layer, and the conductive part 72 may include only a tab part, or may include a tab part and an adapting piece electrically connected to the tab part, etc., which are not limited here.

The post terminal bodies 2 are provided with communication holes 22 communicating the first accommodating groove 211 with the accommodating cavity 1A, one or a plurality of the communication holes 22 are provided and at least one of the communication holes 22 serves as the liquid transfer hole 23, and the conductive part 72 is disposed on at least one of the communication holes 22 in a penetrating manner to be at least partially received in the first accommodating groove 211. Illustratively, the post terminal body 2 is provided with a first accommodating groove 211 and a communication hole 22, the first accommodating groove 211 opening toward a direction distal to the accommodating cavity 1A to be in communication with the liquid injection hole 31, and the communication hole 22 being located on a side of the first accommodating groove 211 proximal to the accommodating cavity 1A; the communication hole 22 penetrates through a groove wall of the first accommodating groove 211 on a side proximal to the accommodating cavity 1A to communicate the first accommodating groove 211 with the accommodating cavity 1A; at least one communication hole 22 is a liquid transfer hole 23, and the conductive part 72 can pass through the communication hole 22 as the liquid transfer hole 23 (that is, the communication hole 22 through which the conductive part 72 passes can still be configured to allow the electrolytic solution to flow through after the conductive part 72 passes through), or can pass through the communication hole 22 which is not the liquid transfer hole 23 (that is, the communication hole 22 through which the conductive part 72 passes cannot be configured to allow the electrolytic solution to flow through after the conductive part 72 passes through).

Therefore, the conductive part 72 is at least partially received in the first accommodating groove 211, such that the conductive part 72 at least partially occupies the space in the first accommodating groove 211, thereby reducing the space in the accommodating cavity 1A occupied by the conductive part 72, and saving the space in the accommodating cavity 1A to accommodate a larger volume of the active substance-coated part 71, which is beneficial to increasing the energy density of the battery cell 102, or is beneficial to reducing the dimension of the battery cell 102 when the energy density of battery cell 102 remains unchanged.

Figure 7:
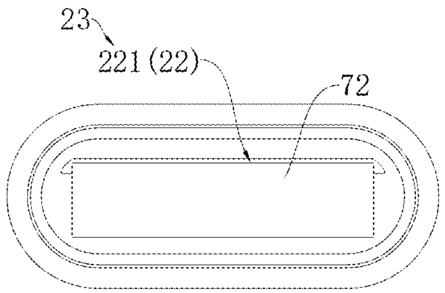
FIG. 7 is a schematic diagram illustrating the mating between a post terminal body and a conductive part, according to some embodiments of the present application.

In some embodiments, referring to FIG. 7, the communication hole 22 on which the conductive part 72 is disposed in a penetrating manner is a first communication hole 221 (that is, at least one communication hole 22 is provided with the conductive part 72 in a penetrating manner, and the communication hole 22 on which the conductive part 72 is disposed in a penetrating manner is the first communication hole 221), and at least the first communication hole 221 may serve as the liquid transfer hole 23. In this way, when the post terminal body 2 is provided with the first communication hole 221 through which the conductive part 72 passes, regardless of whether the post terminal body 2 is provided with the second communication hole 222 on which no conductive part 72 is disposed in a penetrating manner and will be described later, the first communication hole 221 on which the conductive part 72 is disposed in a penetrating manner also has the liquid passage function, that is, a liquid transfer gap is also formed after the first communication hole 221 is provided with the conductive part 72 in a penetrating manner. During liquid injection, the electrolytic solution can be injected into the first accommodating groove 211 via the liquid injection hole 31, and then the electrolytic solution can at least partially flow into the accommodating cavity 1A from the first communication hole 221 on which the conductive part 72 is disposed in a penetrating manner.

Figure 8:
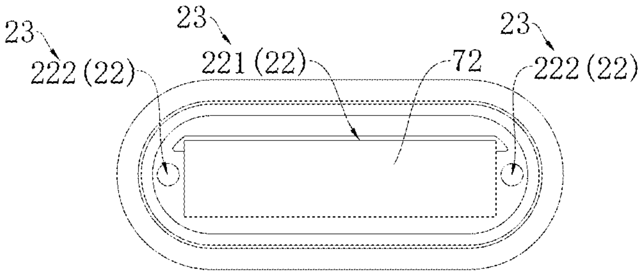
FIG. 8 is a schematic diagram illustrating the mating between a post terminal body and a conductive part, according to some embodiments of the present application.

In some embodiments, referring to FIG. 8, the communication hole 22 on which the conductive part 72 is disposed in a penetrating manner is a first communication hole 221. A plurality of communication holes 22 are provided and further include at least one second communication hole 222 on which no conductive part 72 is disposed in a penetrating manner (that is, at least one communication hole 22 is not provided with the conductive part 72 in a penetrating manner, and the communication hole 22 on which no conductive part 72 is disposed in a penetrating manner is the second communication hole 222). At least the second communication hole 222 may serve as the liquid transfer hole 23.

For example, when the first communication hole 221 has the liquid passage function (that is, the first communication hole 221 is further provided with a liquid transfer gap after the conductive part 72 passes through), the first communication hole 221 and the second communication hole 222 both serve as the liquid transfer holes 23. During liquid injection, the electrolytic solution is injected into the first accommodating groove 211 via the liquid injection hole 31, then a part thereof may flow into the accommodating cavity 1A from the first communication hole 221 on which the conductive part 72 is disposed in a penetrating manner, and another part thereof may flow into the accommodating cavity 1A from the second communication hole 222 on which no conductive part 72 is disposed in a penetrating manner.

For another example, when the first communication hole 221 does not have the liquid passage function (that is, the first communication hole 221 is blocked and cannot allow a liquid to pass through after the conductive part 72 passes through), only the second communication hole 222 can serve as the liquid transfer hole 23. During liquid injection, the electrolytic solution is injected into the first accommodating groove 211 via the liquid injection hole 31, and then flows into the accommodating cavity 1A only from the second communication hole 222 on which no conductive part 72 is disposed in a penetrating manner.

In the embodiments of the present application, when at least the first communication hole 221 serves as the liquid transfer hole 23, the first communication hole 221 has a liquid passage function, that is, the first communication hole 221 provided with the conductive part 72 in a penetrating manner can be configured to allow the electrolytic solution to pass through. In this case, at least the first communication hole 221 can be configured to allow the electrolytic solution to pass through. Therefore, whether to provide a communication hole 22 (such as the second communication hole 222) on which no conductive part 72 is disposed in a penetrating manner can be selected as required, thereby facilitating the reduction of the total number of communication holes 22 disposed, simplifying the structure and machining of the post terminal body 2, and improving the structural strength of the post terminal body 2.

In the embodiments of the present application, when at least the second communication hole 222 serves as the liquid transfer hole 23, at least the second communication hole 222 can be configured for allowing the electrolytic solution to pass through. In this case, there is no need to set the hole diameter or number of the first communication holes 221 to be large in order to allow the electrolytic solution to pass through the first communication hole 221, and there is also no need to set the dimension of the conductive part 72 to be small in order to allow the electrolytic solution to pass through the first communication hole 221, and it is only necessary to design the dimension of the first communication hole 221 to be slightly larger than the dimension of the conductive part 72, such that the conductive part 72 can pass through, thereby mitigating the problem that impurities or the like fall into the accommodating cavity 1A from the gap between the conductive part 72 and the first communication hole 221, and also mitigating the problem that the local strength of the post terminal body 2 is weak due to the oversized first communication hole 221, and also making the dimension of the conductive part 72 relatively large, which is beneficial to increasing the current passage efficiency. In addition, when the electrolytic solution passes through the second communication hole 222, the electrolytic solution is not affected by the conductive part 72, so that the liquid injection efficiency can be increased. In addition, the electrolytic solution is not prone to causing problems such as contamination and corrosion to the conductive part 72.

For example, in Example 1 of the present application, at least one communication hole 22 is provided, and each communication hole 22 is provided with the conductive part 72 in a penetrating manner, such that each communication hole 22 is the first communication hole 221. In this case, at least one first communication hole 221 constitutes the liquid transfer hole 23, and the electrolytic solution is injected into the first accommodating groove 211 via the liquid injection hole 31, and then flows into the accommodating cavity 1A from the first communication hole 221 on which the conductive part 72 is disposed in a penetrating manner.

For example, in Example 2 of the present application, at least two communication holes 22 are provided, at least one communication hole 22 is a first communication hole 221 on which the conductive part 72 is disposed in a penetrating manner, and at least one communication hole 22 is a second communication hole 222 on which no conductive part 72 is disposed in a penetrating manner. In this case, the first communication hole 221 and the second communication hole 222 both constitute a liquid transfer hole 23, and the electrolytic solution is injected into the first accommodating groove 211 via the liquid injection hole 31, a part thereof flows into the accommodating cavity 1A from the first communication hole 221 on which the conductive part 72 is disposed in a penetrating manner, and the rest thereof flows into the accommodating cavity 1A from the second communication hole 222 on which no conductive part 72 is disposed in a penetrating manner.

For example, in Example 3 of the present application, at least two communication holes 22 are provided, at least one communication hole 22 is a first communication hole 221 on which the conductive part 72 is disposed in a penetrating manner, and at least one communication hole 22 is a second communication hole 222 on which no conductive part 72 is disposed in a penetrating manner. The first communication hole 221 is blocked and cannot allow a liquid to pass through after the conductive part 72 passes through. At this time, only the second communication hole 222 constitutes a liquid transfer hole 23, and the electrolytic solution is injected into the first accommodating groove 211 via the liquid injection hole 31, and then flows into the accommodating cavity 1A from the second communication hole 222 on which no conductive part 72 is disposed in a penetrating manner.

In some embodiments, the first accommodating groove 211 opens toward a direction away from the accommodating cavity 1A, the opening of the first accommodating groove 211 is located on a side of the first accommodating groove 211 distal to the accommodating cavity 1A, a groove wall of the first accommodating groove 211 on a side proximal to the accommodating cavity 1A is a groove bottom wall 2110, the conductive part 72 is connected to the groove bottom wall 2110 to form a first connecting part 73, and an orthographic projection of the liquid injection hole 31 on the groove bottom wall 2110 and an orthographic projection of the first connecting part 73 on the groove bottom wall are disposed in a staggered manner. The "disposed in a staggered manner" means no overlapping.

For example, when the conductive part 72 is welded to the groove bottom wall 2110 of the first accommodating groove 211 to form a weld mark, the orthographic projection of the liquid injection hole 31 on the groove bottom wall 2110 of the first accommodating groove 211 and the weld mark may be disposed in a staggered manner. Therefore, the electrolytic solution injected from the liquid injection hole 31 can keep away from the first connecting part 73 (such as a weld mark) between the conductive part 72 and the post terminal body 2 as much as possible, thereby reducing the contamination and corrosion caused by the electrolytic solution to the first connecting part 73 (such as a weld mark).

In some embodiments, referring to FIGS. 7 and 8, the post terminal body 2 is formed as an elongated strip structure, and the first communication hole 221 on which the conductive part 72 is disposed in a penetrating manner is formed as an elongated strip hole having a length greater than a width and a length direction extending from one end of the length of the post terminal body 2 to the other end of the length. Therefore, the space of the post terminal body 2 can be fully utilized to increase the length of the first communication hole 221 as much as possible, such that the first communication hole 221 can pass through the conductive part 72 with a larger dimension, which is beneficial to increasing the dimension of the conductive part 72, thereby increasing the current passage efficiency. When the first communication hole 221 serves as the liquid transfer hole 23, increasing the length of the first communication hole 221 is also beneficial to increasing the liquid injection efficiency.

In some embodiments, when the post terminal body 2 is formed as an elongated strip structure, and the first communication hole 221 on which the conductive part 72 is disposed in a penetrating manner is formed as an elongated strip hole having a length greater than a width and a length direction extending from one end of the length of the post terminal body 2 to the other end of the length, the post terminal cover plate 3 is an elongated cover plate, that is, the post terminal cover plate 3 has a length greater than a width; and the liquid injection hole 31 is eccentrically disposed in a length direction of the post terminal cover plate 3, that is, the liquid injection hole 31 is located on a side of the central point of the post terminal cover plate 3 in the length direction of the post terminal cover plate 3. Therefore, the liquid injection hole 31 can avoid the conductive part 72 as much as possible, thereby reducing the contamination and corrosion caused by the injected electrolytic solution to the first connecting part 73 (such as a weld mark) between the conductive part 72 and the post terminal body 2.

In addition, since the post terminal body 2 is formed as the elongated strip structure and the post terminal cover plate 3 is the elongated cover plate, it is beneficial to the sufficient mating between the post terminal body 2 and the post terminal cover plate 3, the increase in the area of the post terminal cover plate 3, and the assembly and connection of the post terminal cover plate 3 and the post terminal body 2. Illustratively, the post terminal cover plate 3 may be an oblong, rectangular, elliptical, or other shape. The oblong may also be referred to as a racetrack shape, that is, two ends of the length of the rectangle are respectively connected to semicircles. The liquid injection hole 31 may be located in a semicircular region or at a junction of a semicircular region and a rectangular region. Certainly, the present application is not limited thereto. In other embodiments of the present application, the liquid injection hole 31 may also be formed at the center on the post terminal cover plate 3, or the like. That is, the position of the liquid injection hole 31 can be flexibly selected according to the actual situation.

In some embodiments of the present application, the post terminal body 2 is formed as an elongated strip structure, and the first accommodating groove 211 is formed as an elongated strip groove body, that is, the first accommodating groove 211 has a length greater than a width, and the length direction of the first accommodating groove 211 extends from one end of the length of the post terminal body 2 to the other end of the length, thereby facilitating full utilization of the space of the post terminal body 2, increasing the dimension of the first accommodating groove 211, and increasing the liquid injection efficiency.

In some embodiments of the present application, the groove wall of the first accommodating groove 211 on the side proximal to the accommodating cavity 1A may be provided as a slope extending obliquely downward toward the direction of the liquid transfer hole 23, so as to facilitate the rapid flow of the electrolytic solution in the first accommodating groove 211 in the direction of the liquid transfer hole 23, thereby increasing the liquid injection efficiency and mitigating the problem of liquid accumulation in the first accommodating groove 211.

In some embodiments of the present application, the cross-sectional shape of the post terminal body 2 can be set to match the cross-sectional shape of the first accommodating groove 211, such that the space can be fully utilized; the dimension of the first accommodating groove 211 can be increased as much as possible, such that the buffer capacity of the first accommodating groove 211 can be increased.

In some embodiments of the present application, when the first accommodating groove 211 is formed as an elongated strip groove body, illustratively, the cross-sectional shape of the first accommodating groove 211 may be set to be an oblong, a rectangle, an ellipse, or the like, thereby achieving flexible arrangement. The oblong may also be referred to as a racetrack shape, that is, two ends of the length of the rectangle are respectively connected to semicircles.

In some embodiments, when the communication holes 22 on which the conductive parts 72 are disposed in a penetrating manner are first communication holes 221, a plurality of the first communication holes 221 and a plurality of conductive parts 72 are provided, and each of the first communication holes 221 is provided with at least one of the conductive parts 72 in a penetrating manner. In this case, at least two communication holes 22 are provided with the conductive parts 72 in a penetrating manner, thereby mitigating the problem that the dimension of a single first communication hole 221 is relatively large, resulting in weak local strength of the post terminal body 2. Moreover, if the first communication hole 221 serves as the liquid transfer hole 23, increasing the number of first communication holes 221 is also beneficial to increasing the liquid injection efficiency.

Illustratively, when the first communication hole 221 is formed as an elongated strip hole having a length greater than a width and a length direction extending from one end of the length of the post terminal body 2 to the other end of the length, the plurality of first communication holes 221 may be spaced apart in the width direction of the post terminal body 2. In this way, the space on the post terminal body 2 can be fully utilized, and the problem that the local strength of the post terminal body 2 is weak due to the relatively large dimension of the single first communication hole 221 can be mitigated. Moreover, if the first communication hole 221 serves as the liquid transfer hole 23, increasing the number of the first communication holes 221 is also beneficial to increasing the liquid injection efficiency.

In some embodiments, when the post terminal body 2 is provided with both the first communication hole 221 and the second communication hole 222, if the first communication hole 221 is formed as an elongated strip hole having a length greater than a width and a length direction extending from one end of the length of the post terminal body 2 to the other end of the length, the second communication hole 222 may be formed at at least one end of the two ends of the length of the first communication hole 221. In this way, the electrolytic solution can be relatively far away from the weld mark of the conductive part 72 and the post terminal body 2, thereby reducing the contamination or corrosion caused by the injected electrolytic solution to the weld mark. In addition, when the second communication holes 222 are formed at both ends of the length of the first communication hole 221, the liquid injection efficiency can be increased, the dimension of each of the second communication holes 222 can be reduced, and the problem that the post terminal body 2 is locally weak can be mitigated.

Certainly, in the embodiments of the present application, the shape of the first communication hole 221 and the relative position relationship between the first communication hole 221 and the second communication hole 222 are not limited to the above description, and can be adjusted according to actual situation.

Figure 9:
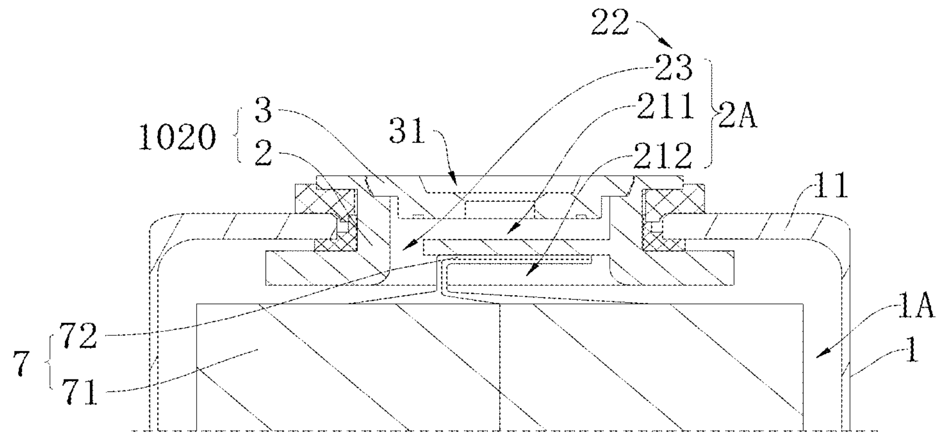
FIG. 9 is a cross-sectional view of a battery cell according to some embodiments of the present application.

Certainly, the present application is not limited thereto. In other embodiments of the present application, the conductive part 72 may not pass through the communication hole 22 and may not extend into the first accommodating groove 211. In this case, as shown in FIG. 9, the conductive part 72 may be connected to the wall surface of the post terminal body 2 on the side facing the accommodating cavity 1A, such that the entire conductive part 72 is located on the side of the first accommodating groove 211 proximal to the accommodating cavity 1A. At this time, each communication hole 22 may serve as a liquid transfer hole 23. Therefore, the electrolytic solution injected from the liquid injection hole 31, when entering the first accommodating groove 211, will not be in contact with the first connecting part 73 (such as a weld mark) between the conductive part 72 and the post terminal body 2, thereby reducing the contamination and corrosion caused by the injected electrolytic solution to the first connecting part 73 between the conductive part 72 and the post terminal body 2, and allowing the liquid injection hole 31 to flexibly select an arrangement position. There is no need to select the position of the liquid injection hole 31 to avoid the first connecting part 73 between the conductive part 72 and the post terminal body 2.

Figure 10:
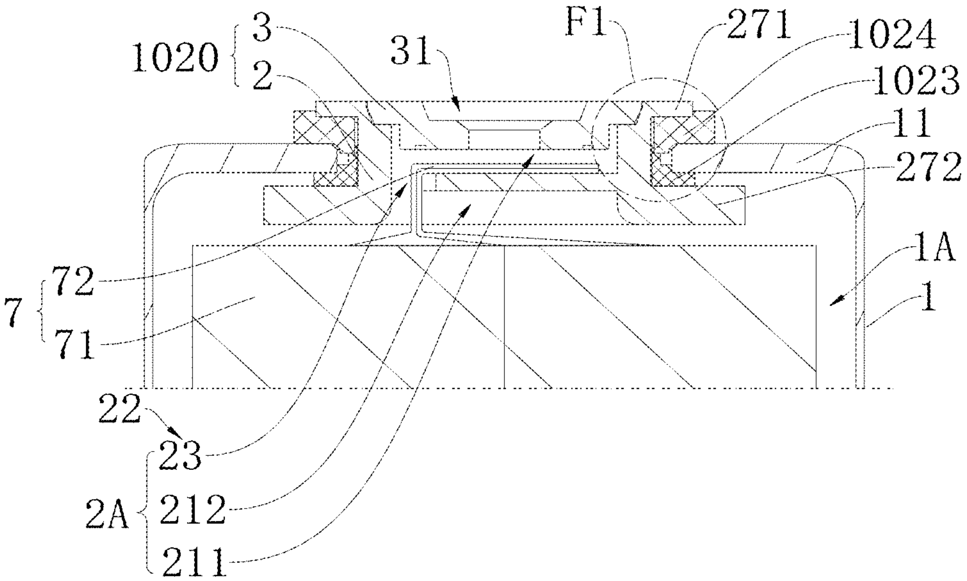
FIG. 10 is a cross-sectional view of a battery cell according to some embodiments of the present application.

In some embodiments, as shown in FIG. 10, the communication channel 2A further includes a second accommodating groove 212, the second accommodating groove 212 being located on the side of the first accommodating groove 211 proximal to the accommodating cavity 1A, and the second accommodating groove 212 opening toward a direction of the accommodating cavity 1A to be in communication with the accommodating cavity 1A. The post terminal bodies 2 are provided with communication holes 22 communicating the first accommodating groove 211 with the second accommodating groove 212, one or a plurality of the communication holes 22 are provided and at least one communication hole 22 serves as the liquid transfer hole 23, such that the liquid transfer hole 23 penetrates through a groove wall of the second accommodating groove 212 to communicate the first accommodating groove 211 with the second accommodating groove 212.

When the battery cell 102 needs to inject the electrolytic solution into the accommodating cavity 1A, the electrolytic solution can be injected into the liquid injection hole 31. Since the liquid injection hole 31 is in communication with the first accommodating groove 211, the electrolytic solution entering the liquid injection hole 31 can flow into the first accommodating groove 211. Moreover, since the first accommodating groove 211 is in communication with the second accommodating groove 212 via the communication hole 22, and the at least one communication hole 22 is a liquid transfer hole 23 to allow the electrolytic solution to pass through, the electrolytic solution entering the first accommodating groove 211 can flow into the second accommodating groove 212 via the liquid transfer hole 23; and since the second accommodating groove 212 is in communication with the accommodating cavity 1A, the electrolytic solution flowing into the second accommodating groove 212 can enter the accommodating cavity 1A, thereby achieving liquid injection into the accommodating cavity 1A via the liquid injection hole 31, the first accommodating groove 211, the liquid transfer hole 23, and the second accommodating groove 212.

Therefore, the second accommodating groove 212 can have the function of buffering the electrolytic solution or gas. When the battery cell 102 is injected with a liquid, the second accommodating groove 212 can be utilized to buffer the electrolytic solution, thereby mitigating problems such as splashing and overflow of the electrolytic solution. When the battery cell 102 operates, the electrolytic solution participates in the reaction and then gas is generated. The second accommodating groove 212 can be utilized to buffer the electrolytic solution or gas generated in the accommodating cavity 1A, thereby mitigating the problem of overflow of the electrolytic solution or excessive air pressure in the accommodating cavity 1A, and thus improving the reliability of the battery cell 102.

In some embodiments, as shown in FIG. 10, when the post terminal body 2 is provided with a second accommodating groove 212, the conductive part 72 can pass through at least one communication hole 22 and extend into the first accommodating groove 211, and the hole through which the conductive part 72 passes is a first communication hole 221. In this case, the first communication hole 221 can serve as the liquid transfer hole 23, and the first communication hole 221 may not serve as the liquid transfer hole 23. Moreover, the communication hole 22 communicating the first accommodating groove 211 with the second accommodating groove 212 can be configured to further include at least one second communication hole 222 on which no conductive part 72 is disposed in a penetrating manner, and the second communication hole 222 can serve as the liquid transfer hole 23. For the above description, reference can be made to the description of the above embodiments without the second accommodating groove 212, which will not be repeated here.

Illustratively, when the post terminal body 2 is provided with a second accommodating groove 212, as shown in FIG. 9, the conductive part 72 may not pass through the communication hole 22 to be entirely located on the side of the first accommodating groove 211 proximal to the accommodating cavity 1A. For example, the conductive part 72 is connected to the wall surface of the post terminal body 2 on the side facing the accommodating cavity 1A, such that the conductive part 72 is connected to the groove wall of the second accommodating groove 212 on the side distal to the accommodating cavity 1A (such as the groove top wall of the second accommodating groove 212). At this time, the conductive part 72 can be at least partially received in the second accommodating groove 212, so that the space in the accommodating cavity 1A occupied by the conductive part 72 can be reduced, and the space in the accommodating cavity 1A can be saved to receive a larger volume of the active substance-coated part 71, which is beneficial to increasing the energy density of the battery cell 102, or is beneficial to reducing the dimension of the battery cell 102 when the energy density of battery cell 102 remains unchanged.

Moreover, when the post terminal body 2 is provided with the second accommodating groove 212, and the conductive part 72 is connected to the wall surface of the post terminal body 2 on the side facing the accommodating cavity 1A, each communication hole 22 can serve as the liquid transfer hole 23. Therefore, the electrolytic solution injected from the liquid injection hole 31, when entering the first accommodating groove 211, is not in contact with the first connecting part 73 (such as a weld mark) between the conductive part 72 and the post terminal body 2 in the second accommodating groove 212, thereby reducing the contamination and corrosion caused by the injected electrolytic solution to the first connecting part 73 between the conductive part 72 and the post terminal body 2. Therefore, the liquid injection hole 31 can flexibly select the arrangement position, and there is no need to select the position of the liquid injection hole 31 to avoid the first connecting part 73 between the conductive part 72 and the post terminal body 2.

In some embodiments of the present application, the liquid injection hole 31 is disposed opposite to the liquid transfer hole 23. That is, the orthographic projection is taken along the axial direction of the liquid injection hole 31, and the orthographic projection of the liquid transfer hole 23 coincides with at least a portion of the orthographic projection of the liquid injection hole 31. Therefore, the electrolytic solution injected from the liquid injection hole 31 can directly flow in the direction of the liquid transfer hole 23 disposed opposite to the liquid injection hole 31, such that the liquid injection can be achieved more quickly and efficiently, and the liquid injection efficiency is increased. It should be noted that the number of the liquid injection holes 31 and the liquid transfer holes 23 is not limited. At least one liquid injection hole 31 may be provided and at least one liquid transfer hole 23 may also be provided, as long as the at least one liquid injection hole 31 and the at least one liquid transfer hole 23 are disposed opposite to each other. In addition, it should be noted that the shapes of the liquid injection hole 31 and the liquid transfer hole 23 may be the same or different, and may be flexibly selected according to actual situation.

Illustratively, when the communication hole 22 does not include the second communication hole 222 but includes only the first communication hole 221, the first communication hole 221 serves as the liquid transfer hole 23. In this case, the liquid injection hole 31 may be disposed opposite to the first communication hole 221, that is, the orthographic projection is taken along the axial direction of the liquid injection hole 31, and the orthographic projection of the first communication hole 221 coincides with at least a portion of the orthographic projection of the liquid injection hole 31. Therefore, the electrolytic solution injected from the liquid injection hole 31 can directly flow in the direction of the first communication hole 221 disposed opposite to the liquid injection hole 31, such that liquid injection can be achieved quickly and efficiently, and the liquid injection efficiency is increased.

Illustratively, when the post terminal body 2 is provided with both the first communication hole 221 and the second communication hole 222, and at least the second communication hole 222 serves as the liquid transfer hole 23, the second communication hole 222 may be disposed opposite to the liquid injection hole 31, that is, the orthographic projection is taken along the axial direction of the liquid injection hole 31, and the orthographic projection of the second communication hole 222 coincides with at least a portion of the orthographic projection of the liquid injection hole 31. Therefore, the electrolytic solution injected from the liquid injection hole 31 can directly flow in the direction of the second communication hole 222 disposed opposite to the liquid injection hole 31, such that liquid injection can be achieved quickly and efficiently, and the liquid injection efficiency is increased.

Further, the first communication hole 221 and the liquid injection hole 31 may be disposed in a staggered manner, that is, the orthographic projection is taken along the axial direction of the liquid injection hole 31, and the orthographic projection of the first communication hole 221 does not coincide with the orthographic projection of the liquid injection hole 31. In this way, the electrolytic solution injected from the liquid injection hole 31 can avoid the direction of the first communication hole 221, so as to reduce the risk of the electrolytic solution contaminating the first connecting part 73 between the conductive part 72 disposed on the first communication hole 221 in a penetrating manner and the post terminal body 2. However, the present application is not limited thereto. In some embodiments of the present application, the liquid injection hole 31 may also be disposed opposite to both the second communication hole 222 and the first communication hole 221 as required.

In addition, when the conductive part 72 is connected to the wall surface of the post terminal body 2 on the side facing the accommodating cavity 1A (regardless of whether the communication channel 2A includes the second accommodating groove 212), each communication hole 22 can serve as the liquid transfer hole 23. In some embodiments, the liquid injection hole 31 and at least one communication hole 22 can be disposed opposite to each other, and each communication hole 22 is disposed in a staggered manner with the first connecting part 73 (such as a weld mark) between the conductive part 72 and the post terminal body 2; namely, the orthographic projection is taken along the axial direction of the liquid injection hole 31, and the orthographic projection of each communication hole 22 does not coincide with the orthographic projection of the first connecting part 73, so that the contamination and corrosion caused by the electrolytic solution to the weld mark can be reduced on the premise of increasing the liquid injection efficiency.

It can be understood that the post terminal cover plate 3 is located on the outer side of at least a portion of the post terminal body 2 (i.e., the side distal to the accommodating cavity 1A), so as to lid the post terminal body 2 with the post terminal cover plate 3. In this way, the liquid injection hole 31 on the post terminal cover plate 3 can be located upstream of the communication channel 2A on the post terminal body 2. However, it should be noted that the manner of assembling the post terminal cover plate 3 and the post terminal body 2 is not limited. For example, the post terminal cover plate 3 may be completely located on the outer side of the post terminal body 2 (i.e., the side distal to the accommodating cavity 1A), or the post terminal cover plate 3 may be partially embedded in the post terminal body 2.

For example, in some embodiments of the present application, as shown in FIG. 6, the post terminal cover plate 3 is at least partially embedded in the first accommodating groove 211. Since the first accommodating groove 211 serves as a portion of the communication channel 2A, it indicates that an empty cavity is formed between the post terminal cover plate 3 and the groove wall of the first accommodating groove 211. In this way, while the post terminal cover plate 3 occupies the space in the first accommodating groove 211, it is ensured that a space for the electrolytic solution to flow is present in the first accommodating groove 211, such that the electrolytic solution injected from the liquid injection hole 31 of the post terminal cover plate 3 can enter the liquid transfer hole 23 via the empty cavity, thereby meeting the liquid injection demands. Moreover, the empty cavity can also buffer the electrolytic solution, thereby mitigating the problems such as splashing and overflow of the electrolytic solution. In addition, when the battery cell 102 is in use, the empty cavity can be configured to buffer the gas generated in the battery cell 102 or the electrolytic solution overflowing from the accommodating cavity 1A, thereby facilitating the improvement of the operational reliability of the battery cell 102. Moreover, when the battery cell 102 is in production, the empty cavity can also buffer the injected electrolytic solution, thereby mitigating the overflow of the electrolytic solution and increasing the liquid injection efficiency. In addition, by at least partially embedding the post terminal cover plate 3 in the first accommodating groove 211, the space occupied by the post terminal cover plate 3 outside the post terminal body 2 can be reduced, thus improving the structural compactness.

In some embodiments of the present application, as shown in FIG. 10, the edge of the post terminal cover plate 3 is provided with a lap joint part 32, the lap joint part 32 overlapping the side of the post terminal body 2 distal to the accommodating cavity 1A. Therefore, the mating and connection between the post terminal cover plate 3 and the post terminal body 2 are facilitated, and the height of the empty cavity between the post terminal cover plate 3 and the groove wall of the first accommodating groove 211 is easily controlled, such that the volume of the empty cavity meets the design demands. In addition, when the lap joint part 32 is welded to the post terminal body 2 and the post terminal body 2 is provided with the liquid transfer hole 23, the lap joint part 32 can be away from the liquid transfer hole 23. When the electrolytic solution overflows from the liquid transfer hole 23, the electrolytic solution can be away from the welding joint between the lap joint part 32 and the post terminal body 2, thereby mitigating problems such as corrosion and contamination to the welding joint.

Illustratively, as shown in FIG. 10, when the communication channel 2A includes the first accommodating groove 211, a surface of the post terminal body 2 on the side distal to the accommodating cavity 1A is provided with a recess 25 disposed around the first accommodating groove 211, and the lap joint part 32 is at least partially embedded in the recess 25, such that the lap joint part 32 overlaps the side of the post terminal body 2 distal to the accommodating cavity 1A. Therefore, the recess 25 can be used for positioning to increase the assembly efficiency of the post terminal body 2 and the post terminal cover plate 3. Moreover, the recess 25 can be used for limiting to a certain extent to improve the stability and the reliability of the mating between the post terminal body 2 and the post terminal cover plate 3. In addition, by providing the recess 25, the post terminal cover plate 3 can be further embedded into the post terminal body 2, such that the post terminal cover plate 3 protrudes less or does not protrude from the post terminal body 2, which is beneficial to reducing the space occupation outside the post terminal body 2.

Figure 11:
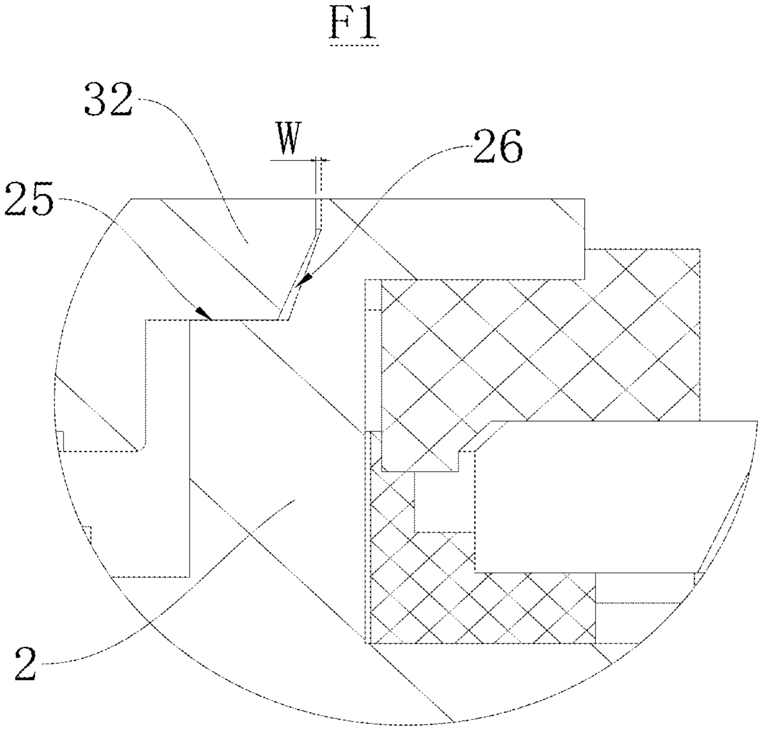
FIG. 11 is a partial enlarged view of the circled portion F1 in FIG. 10.

In some embodiments of the present application, as shown in FIGS. 10 and 11, a mating gap 26 is formed between the lap joint part 32 and a side wall of the recess 25, and a dimension W of an end of the mating gap 26 distal to the accommodating cavity 1A is less than 0.05 mm, that is, the mating gap 26 is greater than 0 mm and less than 0.05 mm. Therefore, in one aspect, the lap joint part 32 of the post terminal cover plate 3 can be smoothly assembled with the recess 25 of the post terminal body 2; in another aspect, the mating gap 26 between the two is not too large. When the lap joint part 32 and the post terminal body 2 are connected by welding, the welding pass rate of the lap joint part 32 and the post terminal body 2 can be improved. It should be noted that the manner of welding the lap joint part 32 and the post terminal body 2 is not limited. For example, the lap joint part 32 and the post terminal body 2 may be welded by hot fusion welding or brazing, and illustratively, by continuous laser welding.

In some embodiments of the present application, the shape of the post terminal cover plate 3 matches the cross-sectional shape of the first accommodating groove 211. Therefore, the first accommodating groove 211 can be lidded with the post terminal cover plate 3. After the liquid injection hole 31 on the post terminal cover plate 3 is sealed, the first accommodating groove 211 can be sealed, thereby simplifying sealing measures for the first accommodating groove 211, reducing the number of parts, simplifying the structure, facilitating the assembly, and reducing the cost. Further, cross-sectional shapes of the lap joint part 32 and the recess 25 match. In this way, it can be better ensured that the mating gap 26 between the lap joint part 32 and the side wall of the recess 25 is uniform.

In some embodiments of the present application, as shown in FIG. 10, the post terminal body 2 may include an outer stopper part 271 position-limited outside the housing 1, and an inner stopper part 272 position-limited inside the housing 1. The lap joint part 32 overlaps the outer stopper part 271, and the post terminal body 2 is riveted to the housing 1 to form the outer stopper part 271. That is, the post terminal body 2 is fixed to the housing 1 by riveting, and after the post terminal body 2 is riveted, the outer stopper part 271 is formed. That is, the post terminal body 2 is not provided with the outer stopper part 271 before riveting, and the outer stopper part 271 can be formed after riveting. For example, the post terminal body 2 may be first formed by using a stamping forming process, and then the post terminal body 2 is fixed to the housing 1 by riveting.

Therefore, preliminary machining (such as a stamping process) before the post terminal body 2 is riveted can be simplified, so as to conveniently obtain the outer stopper part 271. When the structure of the outer stopper part 271 is relatively complicated, a mold (such as a stamping mold) for preliminary machining the post terminal body 2 can be simplified, thereby reducing the production cost. Moreover, the post terminal body 2 riveted to the housing 1 may be an integrally formed part, such that the post terminal body 2 can be reliably connected to the housing 1, and the connection between the outer stopper part 271 and the inner stopper part 272 is stable and reliable, which is beneficial to improving the connection reliability between the post terminal body 2 and the post terminal cover plate 3.

Certainly, the present application is not limited thereto. For example, in other embodiments, the inner stopper part 272 may also be machined by riveting. Or, in other embodiments, the post terminal body 2 may be obtained by using a process other than riveting. For example, the post terminal body 2 may be divided into two portions and connected by welding to be fixed on the housing 1.

Illustratively, as shown in FIG. 10, the battery cell 102 may further include a sealing gasket 1023 (such as a sealing ring) and an insulating gasket 1024 (such as a plastic gasket). The sealing gasket 1023 and the insulating gasket 1024 are sandwiched between the post terminal body 2 and the housing 1, and the post terminal body 2 is riveted to the housing 1, such that the sealing gasket 1023 and the insulating gasket 1024 are fixed between the post terminal body 2 and the housing 1, which can increase the production efficiency, and can avoid the adverse thermal impact of the welding process on the sealing gasket 1023 and the insulating gasket 1024. For example, during riveting, a compression amount of the sealing gasket 1023 (that is, a difference between a thickness of the sealing gasket 1023 after deformation and a thickness thereof before deformation divided by the thickness thereof before deformation) may be greater than or equal to 15%, to ensure the sealing performance.

In some embodiments of the present application, the liquid injection hole 31 is formed on a post terminal cover plate 3 of the cathode, and the post terminal cover plate 3 of the cathode is made of the same material as the post terminal body 2 of the cathode. Illustratively, the post terminal cover plate 3 needs to be welded to the post terminal body 2, and the post terminal cover plate 3 needs to be welded to the busbar component 103. When the post terminal cover plate 3 and the post terminal body 2 are made of the same material, the welding pass rate of the two is relatively high. When the post terminal cover plate 3 and the busbar component 103 are made of the same material, the welding pass rate of the two is relatively high. The material of the post terminal body 2 of the cathode is usually aluminum, and the material of the busbar component 103 of the cathode is usually aluminum. Therefore, the material of the post terminal cover plate 3 of the cathode may also be aluminum, such that the post terminal cover plate 3 of the cathode, the post terminal body 2 of the cathode, and the busbar component 103 of the cathode each have a relatively good welding pass rate. When the liquid injection hole 31 is formed on the post terminal cover plate 3 of the cathode, the electrolytic solution flows to the welding joint between the post terminal cover plate 3 of the cathode and the post terminal body 2 of the cathode. Because the welding joint is made of a combination of the same material (such as aluminum and aluminum), the welding joint is not easily corroded, which is beneficial to improving the connection reliability between the post terminal cover plate 3 and the post terminal body 2.

Figure 12:
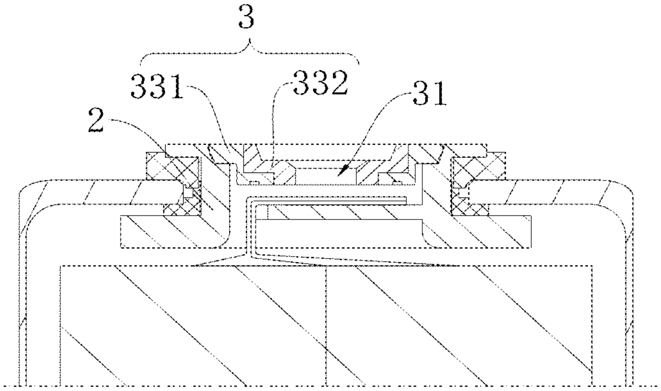
FIG. 12 is a cross-sectional view of a battery cell according to some embodiments of the present application.

In some embodiments of the present application, referring to FIG. 12, the post terminal cover plate 3 includes a first cover plate part 331 and a second cover plate part 332, the first cover plate part 331 being made of the same material as the post terminal body 2, the first cover plate part 331 being connected to the post terminal body 2, and the second cover plate part 332 being connected to the first cover plate part 331; the liquid injection hole 31 is formed on the first cover plate part 331 or the second cover plate part 332. In the above technical solutions, when the liquid injection hole 31 is formed on the post terminal cover plate 3 made of a composite material, and when the first cover plate part 331 and the post terminal body 2 are made of the same material, the electrolytic solution flows to the welding joint between the first cover plate part 331 and the post terminal body 2. Because the welding joint is made of a combination of the same material, the welding joint is not easily corroded, which is beneficial to improving the connection reliability between the post terminal cover plate 3 and the post terminal body 2.

It should be noted that the manner of assembling the first cover plate part 331 and the second cover plate part 332 is not limited. For example, the orthographic projection is taken along the axial direction of the liquid injection hole 31, and the orthographic projection of the first cover plate part 331 and the orthographic projection of the second cover plate part 332 have a non-overlapping portion. The liquid injection hole 31 may be formed on the non-overlapping portion. In this way, the injected electrolytic solution is less likely to cause corrosion and contamination to the welding joint between the first cover plate part 331 and the second cover plate part 332, thereby facilitating the improvement of the reliability of the post terminal cover plate 3.

Illustratively, a post terminal body 2 of the anode is usually made of copper, and the material of the busbar component 103 of the anode is usually aluminum. If the post terminal cover plate 3 of the anode is made of aluminum, when the liquid injection hole 31 is formed on the post terminal cover plate 3 of the anode, the electrolytic solution flows to the welding joint between the post terminal cover plate 3 of the anode and the post terminal body 2 of the anode, and the welding joint is easily corroded due to the combination of different materials (such as aluminum and copper) at the welding joint. Therefore, in some embodiments of the present application, the post terminal cover plate 3 of the anode may be made of a copper-aluminum composite material. The first cover plate part 331 of the anode, which is formed by machining the post terminal cover plate 3 of the anode by using a copper material, is welded to the post terminal body 2 of the anode, and the second cover plate part 332 of the anode, which is formed by machining the post terminal cover plate 3 of the anode by using an aluminum material, is welded to the busbar component 103 of the anode, such that the post terminal cover plate 3 of the anode, the post terminal body 2 of the anode, and the busbar component 103 of the anode each have a relatively good welding pass rate. In this way, when the liquid injection hole 31 is formed on the post terminal cover plate 3 of the anode made of the composite material, the liquid injection hole 31 may be formed on the first cover plate part 331 or the second cover plate part 332. The electrolytic solution flows to the welding joint between the post terminal cover plate 3 of the anode and the post terminal body 2 of the anode. Because the welding joint is made of a combination of the same material (such as copper and copper), the welding joint is not easily corroded. This is beneficial to improving the connection reliability between the post terminal cover plate 3 and the post terminal body 2.

It should be noted that the shape and dimension of the liquid injection hole 31 are not limited and can be specifically selected according to actual situation.

Figure 13:
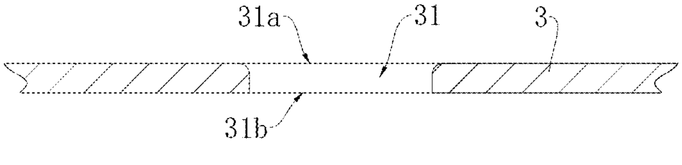
FIG. 13 is a partial cross-sectional view of a post terminal cover plate according to some embodiments of the present application.
Figure 14:
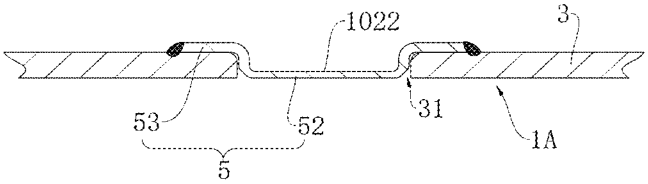
FIG. 14 is a cross-sectional view illustrating the mating between a post terminal cover plate and a sealing structure, according to some embodiments of the present application.

In some embodiments of the present application, as shown in FIGS. 13 and 14, a liquid inlet end 31*a* of the liquid injection hole 31 has a greater liquid passage area than a liquid outlet end 31*b* of the liquid injection hole 31. When the electrolytic solution is injected into the liquid injection hole 31, the electrolytic solution flows in a direction from the liquid inlet end 31*a* to the liquid outlet end 31*b*, and the liquid passage area of the liquid inlet end 31*a* of the liquid injection hole 31 is set to be greater than the liquid passage area of the liquid outlet end 31*b* of the liquid injection hole 31, so as to facilitate the mating between the liquid injection hole 31 and the liquid injection nozzle, for example, facilitate the insertion of the liquid injection nozzle into the liquid inlet end 31*a* of the liquid injection hole 31, which is beneficial to reducing the probability of liquid leakage during electrolytic solution injection. Moreover, since the liquid passage area of the liquid inlet end 31*a* of the liquid injection hole 31 is relatively large, it is convenient to install the sealing structure 1022 and seal the liquid injection hole 31.

Figure 15:
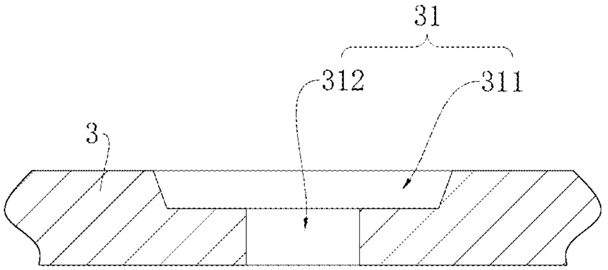
FIG. 15 is a partial cross-sectional view of a post terminal cover plate according to some embodiments of the present application.

In some embodiments of the present application, referring to FIG. 15, the liquid injection hole 31 includes a first hole segment 311 and a second hole segment 312. That is, in some embodiments, the liquid injection hole 31 includes at least a first hole segment 311 and a second hole segment 312, where the first hole segment 311 is located upstream of the second hole segment 312 along a liquid injection flow direction, a liquid passage area of the first hole segment 311 gradually decreases or remains unchanged along a direction from the first hole segment 311 to the second hole segment 312, a liquid passage area of the second hole segment 312 gradually decreases or remains unchanged along the direction from the first hole segment 311 to the second hole segment 312, and a liquid passage area of an outlet end of the first hole segment 311 is greater than or equal to a liquid passage area of an inlet end of the second hole segment 312. As such, the liquid passage area of the liquid inlet end 31*a* of the liquid injection hole 31 may be greater than the liquid passage area of the liquid outlet end 31*b* of the liquid injection hole 31.

Therefore, when the electrolytic solution is injected into the liquid injection hole 31, the electrolytic solution firstly flows through the first hole segment 311 and then flows through the second hole segment 312. Because the liquid passage area of the first hole segment 311 gradually decreases or remains unchanged along the direction from the first hole segment 311 to the second hole segment 312, the liquid passage area of the second hole segment 312 gradually decreases or remains unchanged along the direction from the first hole segment 311 to the second hole segment 312, and the liquid passage area of the outlet end of the first hole segment 311 is greater than or equal to the liquid passage area of the inlet end of the second hole segment 312. It indicates that the liquid passage area of the first hole segment 311 is relatively large, such that the first hole segment 311 can conveniently mate with the liquid injection nozzle. In addition, the first hole segment 311 can play a role in buffering the electrolytic solution, which is beneficial to increasing the liquid injection efficiency and reducing the risks of splashing and overflow of the electrolytic solution. Moreover, it is convenient to assemble the sealing structure 1022 into the liquid injection hole 31 to achieve reliable sealing of the liquid injection hole 31 after liquid injection.

Figure 16:
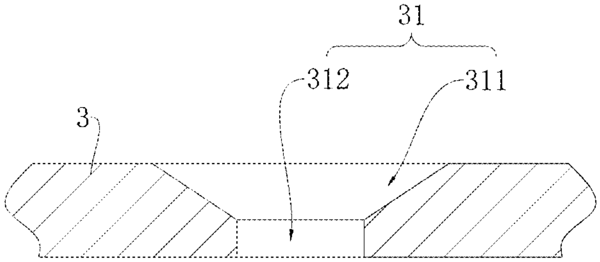
FIG. 16 is a partial cross-sectional view of a post terminal cover plate according to some embodiments of the present application.

In some embodiments of the present application, referring to FIG. 16, the liquid injection hole 31 is composed of a first hole segment 311 and a second hole segment 312. That is, the liquid injection hole 31 only includes the first hole segment 311 and the second hole segment 312. The inlet end of the first hole segment 311 constitutes the liquid inlet end 31*a* of the liquid injection hole 31, and the outlet end of the second hole segment 312 constitutes the liquid outlet end 31*b* of the liquid injection hole 31. The liquid passage area of the first hole segment 311 gradually decreases along the direction from the first hole segment 311 to the second hole segment 312, and the liquid passage area of the outlet end of the first hole segment 311 is equal to the liquid passage area of the inlet end of the second hole segment 312.

Therefore, the liquid injection hole 31 is of a two-segment type, the first hole segment 311 is substantially funnel-shaped, and the side wall of the first hole segment 311 can have a channeling effect, such that the electrolytic solution entering the first hole segment 311 can flow quickly in the direction of the second hole segment 312, thereby increasing the liquid injection efficiency. In addition, because the liquid passage area of the outlet end of the first hole segment 311 is equal to the liquid passage area of the inlet end of the second hole segment 312, no step surface is formed between the first hole segment 311 and the second hole segment 312, together with the funnel shape of the first hole segment 311, such that liquid accumulation is not easy to form in the first hole segment 311.

Figure 17:
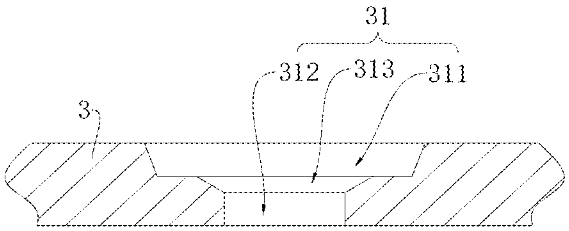
FIG. 17 is a partial cross-sectional view of a post terminal cover plate according to some embodiments of the present application.

In some embodiments of the present application, referring to FIG. 17, the liquid injection hole 31 further includes a third hole segment 313, where the third hole segment 313 is located between the first hole segment 311 and the second hole segment 312 along the liquid injection flow direction; a liquid passage area of the third hole segment 313 gradually decreases along the direction from the first hole segment 311 to the second hole segment 312, a liquid passage area of an inlet end of the third hole segment 313 is less than or equal to the liquid passage area of the outlet end of the first hole segment 311, and a liquid passage area of an outlet end of the third hole segment 313 is equal to the liquid passage area of the inlet end of the second hole segment 312.

Therefore, when the electrolytic solution is injected into the liquid injection hole 31, the electrolytic solution firstly flows through the first hole segment 311, then flows through the third hole segment 313, and then flows through the second hole segment 312, and the liquid passage area of the inlet end of the third hole segment 313 is less than or equal to the liquid passage area of the outlet end of the first hole segment 311, thereby indicating that the liquid passage area of the first hole segment 311 is relatively large, such that the first hole segment 311 can conveniently mate with the liquid injection nozzle. Moreover, the first hole segment 311 can play a role in buffering the electrolytic solution, which is beneficial to increasing the liquid injection efficiency and reducing the risks of splashing and overflow of the electrolytic solution. Moreover, it is convenient to assemble the sealing structure 1022 into the liquid injection hole 31 to achieve reliable sealing of the liquid injection hole 31 after liquid injection. In addition, because the liquid passage area of the third hole segment 313 gradually decreases along the direction from the first hole segment 311 to the second hole segment 312, the third hole segment 313 is generally funnel-shaped, and the side wall of the third hole segment 313 can have a channeling effect, such that the electrolytic solution entering the third hole segment 313 can quickly flow in the direction of the second hole segment 312, thereby increasing the liquid injection efficiency. In addition, because the liquid passage area of the outlet end of the third hole segment 313 is equal to the liquid passage area of the inlet end of the second hole segment 312, no step surface is formed between the third hole segment 313 and the second hole segment 312, together with the funnel shape of the third hole segment 313, such that liquid accumulation is not easy to form in the third hole segment 313.

It should be noted that in some embodiments of the present application, after liquid injection, in order to ensure the sealing performance of the liquid injection hole 31, a sealing structure 1022 may be disposed at the liquid injection hole 31. For example, in some embodiments of the present application, referring to FIG. 14, a sealing structure 1022 may be disposed to mate with the post terminal cover plate 3 to seal the liquid injection hole 31, thereby ensuring the sealing performance of the liquid injection hole 31, preventing the electrolytic solution from overflowing, and preventing external foreign matters from entering the accommodating cavity 1A via the liquid injection hole 31, thereby improving the reliability of the battery cell 102.

In some embodiments, as shown in FIG. 14, the post terminal cover plate 3 is not provided with a portion that stops on an outer side (i.e., a side distal to the accommodating cavity 1A) of the sealing structure 1022, such that the sealing structure 1022 is adapted to be installed on the post terminal cover plate 3 from the outer side (i.e., the side distal to the accommodating cavity 1A) of the post terminal cover plate 3. In this way, the sealing structure 1022 is configured to be installed on the post terminal cover plate 3 from the outer side of the post terminal cover plate 3 to seal the liquid injection hole 31, such that the sealing structure 1022 is installed after liquid injection, which can ensure the sealing performance of the liquid injection hole 31, and moreover, the installation position is proximal to the outer side, which facilitates the rapid assembly of the sealing structure 1022. Moreover, the installation of the sealing structure 1022 will not adversely affect the connection between the post terminal body 2 and the post terminal cover plate 3, thereby ensuring the reliability of the connection between the post terminal cover plate 3 and the post terminal body 2.

Figure 18:
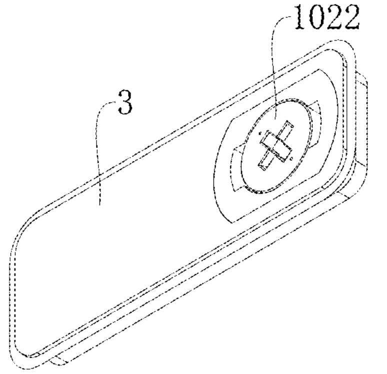
FIG. 18 is a schematic diagram illustrating the mating between a post terminal and a sealing structure, according to some embodiments of the present application.

The sealing structure 1022 may be in a detachable form, or may be in a non-detachable fixed form. Illustratively, as shown in FIG. 18, when the sealing structure 1022 is in a detachable form, it is beneficial to the maintenance of the liquid injection hole 31. For example, when the electrolytic solution needs to be replenished, the sealing structure 1022 can be detached, the liquid injection hole 31 is opened, the electrolytic solution is replenished and injected into the accommodating cavity 1A via the liquid injection hole 31, and then the sealing structure 1022 is assembled back. For example, the sealing structure 1022 can be detachably connected to the post terminal cover plate 3 by means of a thread, a rotary buckle, or the like, thereby facilitating the disassembly and assembly. Illustratively, as shown in FIG. 14, when the sealing structure 1022 is in a non-detachable fixed form, the sealing structure 1022 can be fixed to the post terminal cover plate 3 by welding, riveting, etc., thereby improving the sealing reliability of the sealing structure 1022 for the liquid injection hole 31.

In some embodiments of the present application, as shown in FIG. 14, the sealing structure 1022 is at least partially embedded in the liquid injection hole 31. That is, the entire sealing structure 1022 can be embedded in the liquid injection hole 31, or only a portion of the sealing structure 1022 can be embedded in the liquid injection hole 31. Therefore, in one aspect, the space in the liquid injection hole 31 can be fully utilized to improve the sealing reliability of the sealing structure 1022 for the liquid injection hole 31, and in another aspect, the height of the sealing structure 1022 protruding from the outside of the liquid injection hole 31 can be reduced to reduce the space occupied by the sealing structure 1022 outside the post terminal cover plate 3, which is beneficial to reducing the overall dimension of the battery cell 102.

Figure 19:
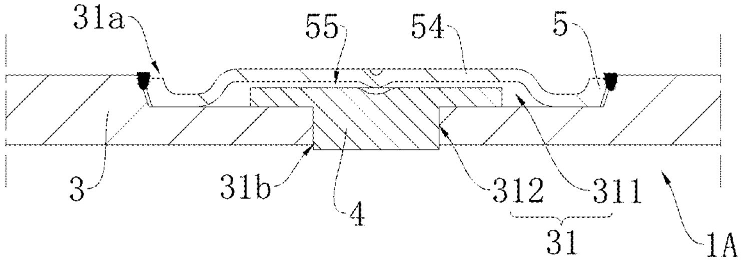
FIG. 19 is a cross-sectional view illustrating the mating between a post terminal cover plate and a sealing structure, according to some embodiments of the present application.
Figure 20:
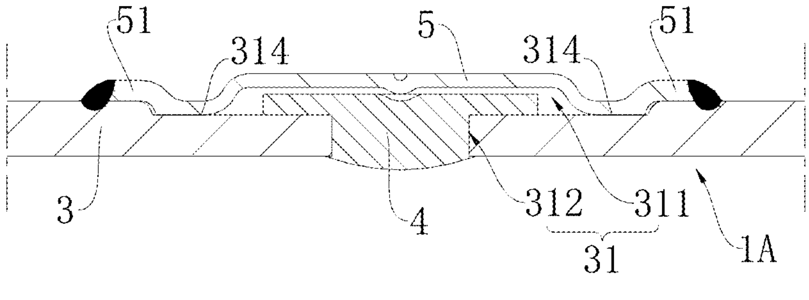
FIG. 20 is a cross-sectional view illustrating the mating between a post terminal cover plate and a sealing structure, according to some embodiments of the present application.

In some embodiments of the present application, as shown in FIGS. 19 and 20, the sealing structure 1022 may include a first sealing member 4, the first sealing member 4 being at least partially embedded in the liquid injection hole 31 and being in interference fit with the liquid injection hole 31 to seal the liquid injection hole 31. Therefore, the first sealing member 4 is fixed in an interference fit manner, thereby facilitating quick installation of the first sealing member 4 and improving the sealing reliability of the first sealing member 4 for the liquid injection hole 31.

In some embodiments of the present application, the sealing structure 1022 may include a second sealing member 5, where the liquid inlet end 31*a* of the liquid injection hole 31 is lidded with the second sealing member 5, and the second sealing member 5 is in sealing connection to the post terminal cover plate 3. Specifically, "the liquid inlet end 31*a* of the liquid injection hole 31 being lidded with the second sealing member 5" is interpreted in a broad sense, and the outer side of the liquid inlet end 31*a* may be lidded with the second sealing member 5 or the second sealing member 5 may be embedded inside the liquid inlet end 31*a*, as long as the second sealing member 5 is located near the liquid inlet end 31*a* and the liquid inlet end 31*a* is lidded with the second sealing member 5. Therefore, sealing can be implemented from a source (i.e., the liquid inlet end 31*a*) of the liquid injection hole 31, such that the probability of contaminating the liquid injection hole 31 with foreign matters can be reduced. In addition, the liquid inlet end 31*a* of the liquid injection hole 31 is lidded with the second sealing member 5, such that rapid assembly of the second sealing member 5 is facilitated, thus increasing the assembly efficiency of the second sealing member 5.

Specifically, the manner of mating the second sealing member 5 with the post terminal cover plate 3 is not limited. For example, in some embodiments, the edge of the second sealing member 5 may overlap the outer side of the post terminal cover plate 3 (that is, the edge of the second sealing member 5 overlaps the side of the post terminal cover plate 3 distal to the accommodating cavity 1A), and/or the second sealing member 5 is at least partially embedded in the liquid injection hole 31, and the second sealing member 5 is in sealing welding fit with the post terminal cover plate 3. Therefore, the assembly and positioning of the second sealing member 5 are facilitated by means of overlapping and/or embedding, and the sealing connection between the second sealing member 5 and the post terminal cover plate 3 is achieved by means of welding, so that the reliability of the sealing connection between the second sealing member 5 and the post terminal cover plate 3 can be improved.

In some embodiments, the liquid injection hole 31 includes a first hole segment 311 and a second hole segment 312 sequentially disposed along a liquid injection flow direction, a hole diameter of the first hole segment 311 is greater than a hole diameter of the second hole segment 312, that is, the liquid passage area of any cross section of the first hole segment 311 is greater than the liquid passage area of any cross section of the second hole segment 312, and the second sealing member 5 is at least partially embedded in the first hole segment 311 and covers the second hole segment 312. It should be noted that the shape of the liquid injection hole 31 in this embodiment may be further selected from any of the above embodiments. For example, the liquid passage area of the first hole segment 311 gradually decreases or remains unchanged along the direction from the first hole segment 311 to the second hole segment 312, and the liquid passage area of the second hole segment 312 gradually decreases or remains unchanged along the direction from the first hole segment 311 to the second hole segment 312, etc.

In the above technical solutions, the portion of the second sealing member 5 embedded in the first hole segment 311 can cover the second hole segment 312, such that the liquid injection hole 31 can be reliably sealed. In addition, because the hole diameter of the first hole segment 311 is relatively large, the second sealing member 5 is at least partially embedded in the first hole segment 311, which facilitates the assembly and positioning of the second sealing member 5, thereby eliminating the need for a positioning fixture and the like for connection, and facilitating the connection between the second sealing member 5 and the post terminal cover plate 3. Moreover, the space occupied by the second sealing member 5 outside the post terminal cover plate 3 can be reduced, which is beneficial to reducing the overall dimension of the battery cell 102.

It should be noted that the cross section of the liquid injection hole 31 may be circular, but is not limited to circular, and may be of other shapes, such as polygonal, elliptical, or oblong. In addition, when the liquid injection hole 31 is in a multi-segment form, each segment of the liquid injection hole 31 may have a circular cross section, or at least one segment of the liquid injection hole 31 may have a non-circular cross section. A "hole diameter" of a hole segment with a non-circular cross section may be understood as an equivalent diameter of the corresponding hole segment.

In some embodiments, as shown in FIG. 19, an edge of the second sealing member 5 is in sealing connection to a hole wall of the first hole segment 311. In the above technical solutions, the edge of the second sealing member 5 is in sealing connection to the hole wall of the first hole segment 311, which indicates that the second sealing member 5 can be completely received in the first hole segment 311 in the radial direction of the first hole segment 311, which is beneficial to further reducing the space occupied by the second sealing member 5 outside the post terminal cover plate 3 and improving the compactness of the fit between the second sealing member 5 and the post terminal cover plate 3. In addition, the stability and the reliability of the connection between the second sealing member 5 and the post terminal cover plate 3 can be improved by using the hole wall of the first hole segment 311 to stop and limit the edge of the second sealing member 5. Illustratively, the second sealing member 5 can be further completely received in the first hole segment 311 in the axial direction of the first hole segment 311, which is beneficial to further reducing the space occupied by the second sealing member 5 outside the post terminal cover plate 3.

In some embodiments, as shown in FIG. 20, the second sealing member 5 includes an extension part 51, the extension part 51 extending to an outside of the first hole segment 311, and overlapping and being in sealing connection to a wall surface of the post terminal cover plate 3 on a side distal to the accommodating cavity 1A. Therefore, the dimension of the extension part 51 in the radial direction of the first hole segment 311 may be increased as required, which is beneficial to increasing the sealing connection area between the second sealing member 5 and the post terminal cover plate 3, thereby improving the reliability of the sealing connection between the second sealing member 5 and the post terminal cover plate 3. In addition, there is a relatively low requirement for the shape of the first hole segment 311, and there is no need to set the edge of the second sealing member 5 to be in clearance fit with the hole wall of the first hole segment 311 that matches the shape and meets the requirement. This reduces the machining precision of the post terminal cover plate 3 and the second sealing member 5, increases the production efficiency, and reduces the production costs.

In some embodiments, as shown in FIG. 20, the liquid injection hole 31 forms a step surface 314 at a joint between the first hole segment 311 and the second hole segment 312, and a portion of the second sealing member 5 embedded in the first hole segment 311 is supported on the step surface 314. Therefore, the connection stability between the second sealing member 5 and the post terminal cover plate 3 can be improved.

In some embodiments, the sealing structure 1022 further includes: a first sealing member 4, the first sealing member 4 being in interference sealing fit with the second hole segment 312 and located on a side of the second sealing member 5 proximal to the accommodating cavity 1A. In the above technical solutions, the sealing structure 1022 includes both the first sealing member 4 and the second sealing member 5. The second sealing member 5 can prevent the first sealing member 4 from falling out of the liquid injection hole 31, improve the reliability of the sealing fit between the first sealing member 4 and the second hole segment 312, and further improve the sealing reliability of the sealing structure 1022 as a whole for the liquid injection hole 31. In addition, the first sealing member 4 is fixed in an interference fit manner, thereby facilitating quick installation of the first sealing member 4.

In addition, when the first hole segment 311 is disposed in the form described above as "the liquid passage area of the first hole segment 311 gradually decreases or remains unchanged along the direction from the first hole segment 311 to the second hole segment 312, and the liquid passage area of the outlet end of the first hole segment 311 is greater than or equal to the liquid passage area of the inlet end of the second hole segment 312", the assembly and connection of the second sealing member 5 are facilitated.

In some embodiments, as shown in FIG. 19, the second sealing member 5 includes a clearance part 54 protruding in a direction distal to the first sealing member 4, a side of the clearance part 54 facing the first sealing member 4 forms a clearance cavity 55, and a portion of the first sealing member 4 extends into the clearance cavity 55. In the above technical solutions, the compactness of the fit between the first sealing member 4 and the second sealing member 5 can be improved, and the occupation and waste of the space can be reduced, thus reducing the volume of the battery cell 102. In addition, the second sealing member 5 is in a concave-convex form, such that the structural strength of the second sealing member 5 can be improved, and the reliability and stability of mating between the second sealing member 5 and the post terminal cover plate 3 can be improved.

In some embodiments of the present application, as shown in FIGS. 19 and 20, the sealing structure 1022 includes both the first sealing member 4 and the second sealing member 5. The first sealing member 4 is at least partially embedded in the liquid injection hole 31 and is in interference fit with the liquid injection hole 31 to seal the liquid injection hole 31. The edge of the second sealing member 5 overlaps the outer side of the post terminal cover plate 3 (referring to FIG. 20, that is, the edge of the second sealing member 5 overlaps the side of the post terminal cover plate 3 distal to the accommodating cavity 1A) and/or the second sealing member 5 is at least partially embedded in the liquid injection hole 31 (referring to FIGS. 19 and 20). The second sealing member 5 is in sealing welding fit with the post terminal cover plate 3, and the second sealing member 5 is located on the side of the first sealing member 4 distal to the accommodating cavity 1A. Therefore, the first sealing member 4 can effectively seal the liquid injection hole 31. The second sealing member 5 can not only seal the liquid injection hole 31, but also prevent the first sealing member 4 from falling out of the liquid injection hole 31, thereby improving the sealing reliability of the sealing structure 1022 for the liquid injection hole 31.

Illustratively, the first sealing member 4 may be made of plastic, rubber, or other materials, which facilitates an interference fit and enhances the sealing effect.

Illustratively, the second sealing member 5 may be made of the same metal material as the post terminal cover plate 3. For example, the second sealing member 5 may be made of aluminum, which is beneficial to improving the welding pass rate between the second sealing member 5 and the post terminal cover plate 3. In addition, it should be noted that the manner of welding the second sealing member 5 and the post terminal cover plate 3 is not limited. For example, hot fusion welding or brazing can be adopted. Illustratively, pulsed laser welding can be adopted to improve the manufacturing efficiency and automation degree.

It should be noted that laser welding requires a relatively high degree of cleanliness of the liquid injection hole 31. If there is a residual electrolytic solution in the liquid injection hole 31, the electrolytic solution is easily vaporized by heat, and exhaust gas generated by the vaporization can erupt through the weld pool, causing defects such as pinholes and blowholes at the welding joint. By configuring the liquid injection hole as follows: the liquid injection hole 31 is composed of a first hole segment 311 and a second hole segment 312, a liquid passage area of the first hole segment 311 gradually decreases along the direction from the first hole segment 311 to the second hole segment 312, and a liquid passage area of an outlet end of the first hole segment 311 is equal to a liquid passage area of an inlet end of the second hole segment 312; or the liquid injection hole 31 further includes a third hole segment 313, the third hole segment 313 is located between the first hole segment 311 and the second hole segment 312 along the liquid injection flow direction, a liquid passage area of the third hole segment 313 gradually decreases along the direction from the first hole segment 311 to the second hole segment 312, a liquid passage area of an inlet end of the third hole segment 313 is less than or equal to a liquid passage area of an outlet end of the first hole segment 311, and a liquid passage area of an outlet end of the third hole segment 313 is equal to a liquid passage area of an inlet end of the second hole segment 312. Because the problem of liquid accumulation in the liquid injection hole 31 can be mitigated, the welding pass rate between the second sealing member 5 and the post terminal cover plate 3 is increased, and the sealing performance is improved.

In some embodiments of the present application, after the post terminal cover plate 3 is welded to the post terminal body 2, the electrolytic solution is injected from the liquid injection hole 31 of the post terminal cover plate 3. The electrolytic solution flows through the communication channels 2A on the post terminal body 2 from the liquid injection hole 31 and enters the housing 1 of the battery cell 102. No other auxiliary structure is required to be disposed below the liquid injection hole 31 and the communication channel 2A, which can simplify the structure and reduce the cost. After the liquid injection is completed, the first sealing member 4 is firstly installed into the liquid injection hole 31 to achieve pre-sealing, then the second sealing member 5 is installed into the liquid injection hole 31, and then the second sealing member 5 is welded to the post terminal cover plate 3 to achieve strict sealing. In addition, when the conductive part 72 needs to pass through the first communication hole 221, firstly, the conductive part 72 is disposed in a penetrating manner and the conductive part 72 is welded to the post terminal body 2, then the post terminal cover plate 3 is welded to the post terminal body 2, and the electrolytic solution is then injected.

In some embodiments, as shown in FIG. 14, the second sealing member 5 may include a central part 52 and an edge part 53 disposed around the central part 52, the central part 52 being embedded in the liquid injection hole 31, and the edge part 53 overlapping and being in sealing connection to a portion of a wall surface of the post terminal cover plate 3 on a side distal to the accommodating cavity 1A surrounding the liquid injection hole 31. Therefore, the shape of the liquid injection hole 31 is less demanding, and the post terminal cover plate 3 does not need to be thickened in order to machine the liquid injection hole 31 into a complex shape, such that the post terminal cover plate 3 can be thinned. Moreover, the positioning of and the mating between the second sealing member 5 and the post terminal cover plate 3 are stable, which is beneficial to improving the connection stability and the reliability between the second sealing member 5 and the post terminal cover plate 3. In addition, the mating between the second sealing member 5 and the post terminal cover plate 3 is compact, which is beneficial to saving space. In addition, the manner in which the second sealing member 5 is overlapped with and connected to the post terminal cover plate 3 facilitates quick connection therebetween.

It should be noted that the sealing structure 1022 may include only the first sealing member 4, or may include only the second sealing member 5, or may include both the first sealing member 4 and the second sealing member 5. In the above embodiments, when it is not explained that the sealing structure 1022 includes both the first sealing member 4 and the second sealing member 5, whether the first sealing member 4 or the second sealing member 5 is separately disposed or both the first sealing member 4 and the second sealing member 5 are disposed may be specifically selected as required. This is not limited here.

Figure 21:
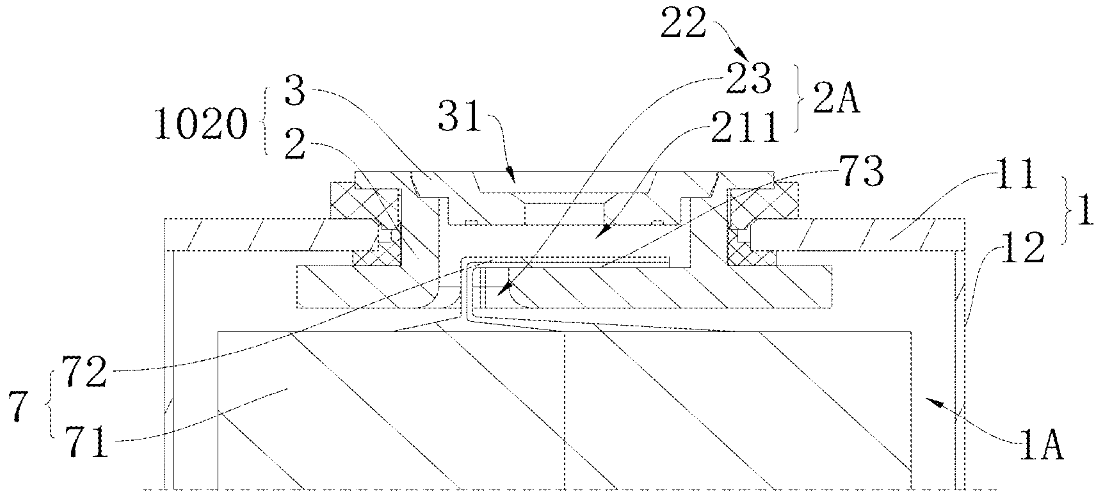
FIG. 21 is a cross-sectional view of a battery cell according to some embodiments of the present application.

In some embodiments of the present application, the housing 1 includes a first housing wall 11, and the post terminal bodies 2 are disposed on the first housing wall 11. As shown in FIG. 6, the first housing wall 11 and at least one second housing wall 12 are integrally formed, and the second housing wall 12 extends toward a side in a thickness direction of the first housing wall 11. Or, as shown in FIG. 21, the first housing wall 11 is an integrally formed cover plate. As such, the flexible design of the position of the post terminal 1020 can be achieved, thereby expanding the application range of the battery cell 102 according to the embodiments of the present application.

It should be noted that the second housing wall 12 may extend out from the edge of the first housing wall 11. When the first housing wall 11 is rectangular, at least one of the four edges of the first housing wall 11 may extend out of the second housing wall 12. For example, only one edge of the first housing wall 11 extends out of the second housing wall 12, or only two edges of the first housing wall 11 may extend out of the second housing wall 12, or three edges of the first housing wall 11 may extend out of the second housing wall 12, or all four edges of the first housing wall 11 may extend out of the second housing wall 12. Illustratively, when the housing 1 is a rectangular housing, any wall surface of the rectangular housing may serve as the first housing wall 11.

For example, the housing 1 may include a housing body and a cover plate. The housing body defines a space with one side open, and the cover plate is disposed on the open side of the housing body to form the accommodating cavity 1A between the housing body and the cover plate. In this case, the wall surface of the housing body on a side opposite to the cover plate serves as the first housing wall 11, and the wall surface of the housing body connected between the first housing wall 11 and the cover plate serves as the second housing wall 12; or the wall surface of the housing body on a side opposite to the cover plate serves as the second housing wall 12, and the wall surface of the housing body connected between the second housing wall 12 and the cover plate serves as the first housing wall 11; or, the cover plate serves as the first housing wall 11.

Figure 22:
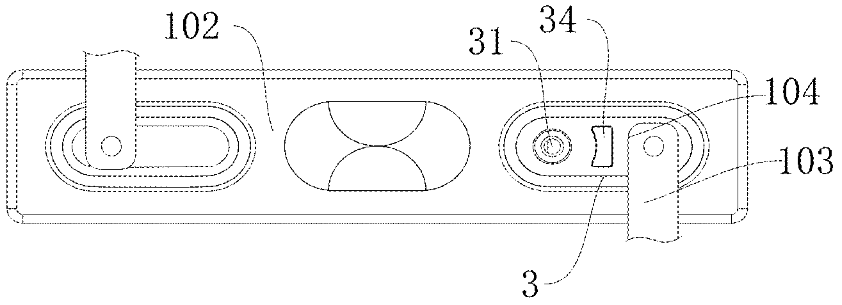
FIG. 22 is a schematic diagram illustrating the mating between a battery cell and a busbar component, according to some embodiments of the present application.

According to some embodiments of the present application, referring to FIGS. 2 and 22, the present application further provides a battery 100, which includes busbar components 103 and the battery cells 102 according to any one of the above solutions, where a plurality of the battery cells 102 are provided and at least two of the battery cells 102 are electrically connected by the corresponding busbar component 103. As such, this enables the plurality of battery cells 102 to be connected in series and/or in parallel. Both the performance and manufacturability of the battery cell 102 according to the embodiments of the present application are improved, thereby facilitating the improvement of the performance and manufacturability of the battery 100. It should be noted that the battery 100 according to the embodiments of the present application may include a case 101, or may not include a case 101.

For example, when a plurality of battery cells 102 are connected in series, the post terminal cover plate 3 of the anode of one battery cell 102 is connected to the post terminal cover plate 3 of the cathode of the next battery cell 102 through one busbar component 103. Meanwhile, the post terminal cover plate 3 of the cathode of the battery cell 102 is connected to the post terminal cover plate 3 of the anode of the previous battery cell 102 through another busbar component 103.

In some embodiments, as shown in FIG. 22, the busbar component 103 is connected to a surface (i.e., an outer surface) of the post terminal cover plate 3 on a side distal to the accommodating cavity 1A to form a second connecting part 104 (e.g., a weld mark formed by welding). The liquid injection hole 31 and the second connecting part 104 are disposed in a staggered manner, that is, the liquid injection hole 31 does not overlap with the second connecting part 104. Therefore, when the electrolytic solution overflows from the liquid injection hole 31, it can reduce the contamination and corrosion caused by the electrolytic solution to the second connecting part 104, and avoid the influence of the sealing structure 1022 with which the liquid injection hole 31 is lidded on the connection between the busbar component 103 and the post terminal cover plate 3, and improve the convenience and reliability of the connection between the busbar component 103 and the post terminal cover plate 3.

In some embodiments, as shown in FIG. 22, a boundary part 34 is formed on the surface (i.e., an outer surface) of the post terminal cover plate 3 on the side distal to the accommodating cavity 1A, and the boundary part 34 is located between the second connecting part 104 and the liquid injection hole 31. It should be noted that the boundary part 34 is of a concave structure or a convex structure. When the electrolytic solution overflows from the liquid injection hole 31, it can be blocked by the boundary part 34, for example, may be stored in the concave structure or blocked by the convex structure, to reduce the probability that the electrolytic solution is in contact with the second connecting part 104, thereby reducing contamination and corrosion caused by the electrolytic solution to the second connecting part 104. In addition, by providing the boundary part 34, it can play the role of identification, such that a connection position between the busbar component 103 and the post terminal cover plate 3 can be far away from the liquid injection hole 31, thereby further reducing the possibility that the electrolytic solution overflowing from the liquid injection hole 31 is in contact with the second connecting part 104. It should be noted that the shape and dimension of the boundary part 34 are not limited as long as it can block the liquid injection hole 31 to a certain extent.

In a third aspect, the embodiments of the present application further provide an electric device, which includes the battery 100 according to any one of the above solutions.

According to some embodiments of the present application, the present application further provides an electric device, which includes the battery 100 according to any one of the above solutions, where the battery 100 is configured to provide electric energy for the electric device. The electric device may be any one of the aforementioned devices or systems that apply the battery 100. The performance of the battery 100 is improved, thereby helping to improve the operational electrical performance of the electric device.

A battery cell 102 according to a specific embodiment of the present application is described below.

Referring to FIGS. 4-6, the battery cell 102 includes a housing 1 and a battery cell assembly 7. The housing 1 defines an accommodating cavity 1A, post terminal bodies 2 are disposed on the housing 1, and each post terminal body 2 is lidded with a corresponding post terminal cover plate 3; the post terminal body 2 is provided with a communication channel 2A in communication with the accommodating cavity 1A, and the post terminal cover plate 3 is provided with a liquid injection hole 31, with the liquid injection hole 31 communicating with the communication channel 2A. The battery cell assembly 7 includes an active substance-coated part 71 and a conductive part 72, where the active substance-coated part 71 is received in the accommodating cavity 1A, and the conductive part 72 connects the active substance-coated part 71 and the post terminal body 2.

Referring to FIGS. 4-6, the post terminal body 2 is provided with a first accommodating groove 211 and a communication hole 22, where the first accommodating groove 211 opens toward the direction of the post terminal cover plate 3 to be in communication with the liquid injection hole 31, and the communication hole 22 penetrates through the groove wall of the first accommodating groove 211 and communicates the first accommodating groove 211 with the accommodating cavity 1A. The conductive part 72 is disposed on at least one communication hole 22 in a penetrating manner to be at least partially received in the first accommodating groove 211. One or a plurality of communication holes 22 are provided, and the at least one communication hole 22 serves as the liquid transfer hole 23. The communication channel 2A includes the first accommodating groove 211 and the liquid transfer hole 23.

Referring to FIG. 19, the liquid injection hole 31 includes a first hole segment 311 and a second hole segment 312, where the first hole segment 311 is located upstream of the second hole segment 312 along a liquid injection flow direction, a liquid passage area of the first hole segment 311 gradually decreases along a direction from the first hole segment 311 to the second hole segment 312, a liquid passage area of the second hole segment 312 remains unchanged along the direction from the first hole segment 311 to the second hole segment 312, and a liquid passage area of an outlet end of the first hole segment 311 is greater than a liquid passage area of an inlet end of the second hole segment 312. The battery cell 102 further includes: a first sealing member 4 and a second sealing member 5, where the first sealing member 4 is at least partially embedded in the second hole segment 312 and is in interference fit sealing with the second hole segment 312; the second sealing member 5 is located on the outer side of the first sealing member 4, the liquid inlet end 31*a* of the liquid injection hole 31 is lidded with the second sealing member 5, and the edge of the second sealing member 5 is welded and in sealing connection to the post terminal cover plate 3.

When the battery cell 102 is manufactured, the conductive part 72 is firstly disposed on the communication hole 22 of the post terminal body 2 in a penetrating manner to achieve the welding between the conductive part 72 and the post terminal body 2, then the post terminal body 2 is lidded with the post terminal cover plate 3, the electrolytic solution is injected from the liquid injection hole 31 on the post terminal cover plate 3, and the electrolytic solution enters the housing 1 via the communication channel 2A on the post terminal body 2. After the liquid injection is completed, the first sealing member 4 is firstly installed into the liquid injection hole 31 to achieve the pre-sealing, then the second sealing member 5 is installed into the liquid injection hole 31, and then the second sealing member 5 is welded to the post terminal cover plate 3 to achieve the strict sealing.

It should be noted that the embodiments and features of the embodiments in the present application may be combined with each other without conflict.

The above are only preferred embodiments of the present application, and are not intended to limit the present application. For those skilled in the art, the present application can be modified and varied. Any modification, equivalent substitution, improvement, and the like made within the spirit and principle of the present application shall all fall within the protection scope of the present application.

What is claimed is:

1. A battery cell, comprising:

a housing, defining an accommodating cavity;

a post terminal body, disposed on the housing, and the post terminal body being provided with a communication channel in communication with the accommodating cavity; and a post terminal cover plate, wherein the post terminal body is lidded with the post terminal cover plate, and the post terminal cover plate is provided with a liquid injection hole in communication with the communication channel, wherein the communication channel comprises a first accommodating groove and a liquid transfer hole, the first accommodating groove opening toward a direction of the post terminal cover plate to be in communication with the liquid injection hole, and the liquid transfer hole penetrating through a groove wall of the first accommodating groove and communicating the first accommodating groove with the accommodating cavity, wherein the battery cell comprises a battery cell assembly, the battery cell assembly comprising an active substance-coated part received in the accommodating cavity and at least one conductive part connected to the active substance-coated part; the post terminal body is provided with one or more communication holes, the one or more communications holes comprises at least one first communication hole and at least one second communication hole, the at least one second communication hole is separate and spaced apart from the at least one first communication hole in a length direction of the post terminal body, the at least one first communication hole and the at least one second communication hole respectively communicate the first accommodating groove with the accommodating cavity and configured to serve as the liquid transfer hole, and the at least one conductive part is disposed through the at least one first communication hole in a penetrating manner to be at least partially received in the first accommodating groove, the at least one conductive part is not disposed through the at least one second communication hole in a penetrating manner, wherein the post terminal cover plate is an elongated cover plate, the post terminal body is formed as an elongated strip structure, and the at least one first communication hole is formed as an elongated strip hole extending in a length direction from one of two ends of a length of the post terminal body to the other one of the two ends of the length of the post terminal body, the at least one first communication hole is eccentrically disposed in a length direction of the post terminal cover plate, the at least one second communication hole is disposed proximal to at least one end of the two ends of length of the first communication hole.

2. The battery cell according to claim 1, wherein during liquid injection, when the at least one first communication hole is blocked and cannot allow a liquid to pass through after the conductive part passes through, the at least one second communication hole allows the liquid to pass through and flow into the accommodating cavity.

3. The battery cell according to claim 2, wherein an opening of the first accommodating groove is located on a side of the first accommodating groove distal to the accommodating cavity, a groove wall of the first accommodating groove on a side proximal to the accommodating cavity is a groove bottom wall, the conductive part is connected to the groove bottom wall to form a first connecting part, and an orthographic projection of the liquid injection hole on the groove bottom wall and an orthographic projection of the first connecting part on the groove bottom wall are disposed in a staggered manner;

a plurality of the first communication holes and a plurality of the conductive parts are provided, and each of the plurality of first communication holes is provided with at least one of the plurality of conductive parts in a penetrating manner.

4. The battery cell according to claim 2, wherein the at least one conductive part is connected to a wall surface of the post terminal body on a side facing the accommodating cavity.

5. The battery cell according to claim 2, wherein the communication channel further comprises a second accommodating groove, the second accommodating groove being located on the side of the first accommodating groove proximal to the accommodating cavity, and the second accommodating groove opening toward a direction of the accommodating cavity to be in communication with the accommodating cavity; the liquid transfer hole penetrates through a groove wall of the second accommodating groove to communicate the first accommodating groove with the second accommodating groove.

6. The battery cell according to claim 1, wherein the liquid injection hole is disposed opposite to the liquid transfer hole.

7. The battery cell according to claim 1, wherein the post terminal cover plate is at least partially embedded in the first accommodating groove.

8. The battery cell according to claim 1, wherein an edge of the post terminal cover plate is provided with a lap joint part, the lap joint part overlapping a side of the post terminal body distal to the accommodating cavity.

9. The battery cell according to claim 1, wherein an edge of the post terminal cover plate is provided with a lap joint part, a surface of the post terminal body on a side distal to the accommodating cavity is provided with a recess disposed around the first accommodating groove, and the lap joint part is at least partially embedded in the recess, wherein a mating gap is formed between the lap joint part and a side wall of the recess, and a dimension of the mating gap at an end distal to the accommodating cavity is less than 0.05 mm.

10. The battery cell according to claim 1, wherein the liquid injection hole is formed on a post terminal cover plate of a cathode, and the post terminal cover plate of the cathode is made of a same material as a post terminal body of the cathode.

11. The battery cell according to claim 1, wherein the post terminal cover plate comprises a first cover plate part and a second cover plate part, the first cover plate part being connected to the post terminal body, the first cover plate part being made of a same material as the post terminal body, and the second cover plate part being connected to the first cover plate part; the liquid injection hole is formed on the first cover plate part or the second cover plate part.

12. The battery cell according to claim 1, wherein a liquid inlet end of the liquid injection hole has a greater liquid passage area than a liquid outlet end of the liquid injection hole.

13. The battery cell according to claim 1, wherein the liquid injection hole comprises a first hole segment and a second hole segment, wherein the first hole segment is located upstream of the second hole segment along a liquid injection flow direction, a liquid passage area of the first hole segment gradually decreases or remains unchanged along a direction from the first hole segment to the second hole segment, a liquid passage area of the second hole segment gradually decreases or remains unchanged along the direction from the first hole segment to the second hole segment, and a liquid passage area of an outlet end of the first hole segment is greater than or equal to a liquid passage area of an inlet end of the second hole segment.

14. The battery cell according to claim 13, wherein the liquid injection hole is composed of the first hole segment and the second hole segment, the liquid passage area of the first hole segment gradually decreases along the direction from the first hole segment to the second hole segment, and the liquid passage area of the outlet end of the first hole segment is equal to the liquid passage area of the inlet end of the second hole segment.

15. The battery cell according to claim 13, wherein the liquid injection hole further comprises a third hole segment, wherein the third hole segment is located between the first hole segment and the second hole segment along the liquid injection flow direction; a liquid passage area of the third hole segment gradually decreases along the direction from the first hole segment to the second hole segment, a liquid passage area of an inlet end of the third hole segment is less than or equal to the liquid passage area of the outlet end of the first hole segment, and a liquid passage area of an outlet end of the third hole segment is equal to the liquid passage area of the inlet end of the second hole segment.

16. The battery cell according to claim 1, further comprising:

a sealing structure, the sealing structure mating with the post terminal cover plate and sealing the liquid injection hole, wherein the sealing structure comprises:

a first sealing member, the first sealing member being at least partially embedded in the liquid injection hole, and the first sealing member being in interference fit with the liquid injection hole and sealing the liquid injection hole.

17. The battery cell according to claim 16, wherein the sealing structure comprises:

a second sealing member, wherein a liquid inlet end of the liquid injection hole is lidded with the second sealing member, and the second sealing member is in sealing connection to the post terminal cover plate, wherein the liquid injection hole comprises a first hole segment and a second hole segment sequentially disposed along a liquid injection flow direction, a hole diameter of the first hole segment is greater than a hole diameter of the second hole segment, and the second sealing member is at least partially embedded in the first hole segment and covers the second hole segment, wherein an edge of the second sealing member is in sealing connection to a hole wall of the first hole segment;

the second sealing member comprises an extension part, the extension part extending to an outside of the first hole segment, and overlapping and being in sealing connection to a wall surface of the post terminal cover plate on a side distal to the accommodating cavity;

the second sealing member comprises a central part and an edge part disposed around the central part, the central part being embedded in the liquid injection hole, and the edge part overlapping and being in sealing connection to a portion of a wall surface of the post terminal cover plate on a side distal to the accommodating cavity surrounding the liquid injection hole; and/or the liquid injection hole forms a step surface at a joint between the first hole segment and the second hole segment, and a portion of the second sealing member embedded in the first hole segment is supported on the step surface; and, wherein the sealing structure comprises:

a first sealing member, the first sealing member being in interference sealing fit with the second hole segment and located on a side of the second sealing member proximal to the accommodating cavity, wherein the second sealing member comprises a clearance part protruding in a direction distal to the first sealing member, a side of the clearance part facing the first sealing member forms a clearance cavity, and a portion of the first sealing member extends into the clearance cavity.

18. The battery cell according to claim 1, wherein the housing comprises a first housing wall, and the post terminal body is disposed on the first housing wall, wherein the first housing wall is an integrally formed cover plate, or, the first housing wall and at least one second housing wall are integrally formed, and the second housing wall extends toward a side in a thickness direction of the first housing wall.

19. A battery, comprising busbar components and the battery cells according to claim 1, wherein a plurality of the battery cells are provided and at least two of the battery cells are electrically connected by the corresponding busbar component, wherein the busbar component is connected to a surface of the post terminal cover plate on a side distal to the accommodating cavity to form a second connecting part, and the liquid injection hole and the second connecting part are disposed in a staggered manner, wherein a boundary part is formed on the surface of the post terminal cover plate on the side distal to the accommodating cavity, and the boundary part is located between the second connecting part and the liquid injection hole.

20. An electric device, comprising the battery according to claim 19.

* * * * *